(12) United States Patent
Ohtsu

(10) Patent No.: US 8,411,374 B2
(45) Date of Patent: Apr. 2, 2013

(54) IMAGE PICKUP OPTICAL SYSTEM AND IMAGE PICKUP APPARATUS USING THE SAME

(75) Inventor: Takuya Ohtsu, Tachikawa (JP)

(73) Assignee: Olympus Corporation, Tokyo (JP)

( * ) Notice: Subject to any disclaimer, the term of this patent is extended or adjusted under 35 U.S.C. 154(b) by 115 days.

(21) Appl. No.: 13/157,629

(22) Filed: Jun. 10, 2011

(65) Prior Publication Data

US 2011/0310287 A1    Dec. 22, 2011

(30) Foreign Application Priority Data

Jun. 22, 2010    (JP) .................................. 2010-141281

(51) Int. Cl.
    *G02B 3/02* (2006.01)
    *G02B 9/60* (2006.01)
    *H04N 5/225* (2006.01)
(52) U.S. Cl. .......................... 359/714; 359/764; 348/340
(58) Field of Classification Search .................. 348/335, 348/340; 359/713, 714, 758, 763, 764
    See application file for complete search history.

(56) References Cited

U.S. PATENT DOCUMENTS

| 8,179,613 B2 * | 5/2012 | Sano .............................. 359/714 |
| 2012/0229920 A1 * | 9/2012 | Otsu et al. ..................... 359/764 |

FOREIGN PATENT DOCUMENTS

| JP | 2009-294527 A | 12/2009 |
| JP | 2010-048996 A | 3/2010 |

\* cited by examiner

*Primary Examiner* — David N Spector
(74) *Attorney, Agent, or Firm* — Brosemer, Kolefas & Assoc., LLC

(57) ABSTRACT

The image pickup optical system comprises:
    an aperture is placed on the most object side,
    the image pickup optical system comprises, in order from the object side:
    a first lens having a positive refractive power;
    a second lens having a negative refractive power;
    a third lens having a positive refractive power;
    a fourth lens having a positive refractive power; and
    a fifth lens having a negative refractive power, and
    the following conditional expression is satisfied:

$$-1.49 < (r6+r7)/(r6-r7) < 1.24 \quad (1)$$

where
    r6 is the paraxial radius of curvature of an object side surface of the third lens, and
    r7 is the paraxial radius of curvature of an image plane side surface of the third lens.

13 Claims, 23 Drawing Sheets

IMAGE PICKUP OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2010-141281 filed on Jun. 22, 2010; the entire contents of which are incorporated herein by reference.

BACKGROUND OF THE INVENTION

1. Field of the Invention

The present invention relates to an image pickup optical system and an image pickup apparatus using the same.

2. Description of the Related Art

With the recent demand for thinner cellular phones, personal digital assistants, or notebook computers, camera modules are required to make the length of the image pickup optical system in the optical axis direction thinner to the utmost limit. To meet this requirement, there are proposed many single-focus image pickup optical systems including about two to four aspheric lenses.

Further, with the recent technological advances in and growing market needs for image pickup devices, high-resolution image pickup devices are used, and this requires high-resolution lenses. However, even using conventional lenses having an F-number of about F3.2 or F2.8, it has become difficult to obtain sufficient performance because of the effects of diffraction. As image pickup optical systems in which the entire optical length is reduced while reducing F-number to 2.8 or less to enhance the image formation performance, structures with five lenses are proposed, for example, in the following Japanese Patent Application Laid-Open No. 2009-294527 and Japanese Patent Application Laid-Open No. 2010-48996.

SUMMARY OF THE INVENTION

An image pickup optical system of the present invention is wherein
an aperture is placed on the most object side,
the image pickup optical system comprises, in order from the object side:
a first lens having a positive refractive power;
a second lens having a negative refractive power;
a third lens having a positive refractive power;
a fourth lens having a positive refractive power; and
a fifth lens having a negative refractive power, and
the following conditional expression (1) is satisfied:

$$-1.49 < (r6+r7)/(r6-r7) < 1.24 \quad (1)$$

where
r6 is the paraxial radius of curvature of an object side surface of the third lens, and
r7 is the paraxial radius of curvature of an image plane side surface of the third lens.

An image pickup apparatus of the present invention comprises the above image pickup optical system and an electronic image pickup device having an image pickup plane.

DETAILED DESCRIPTION OF THE INVENTION

Figure 1:
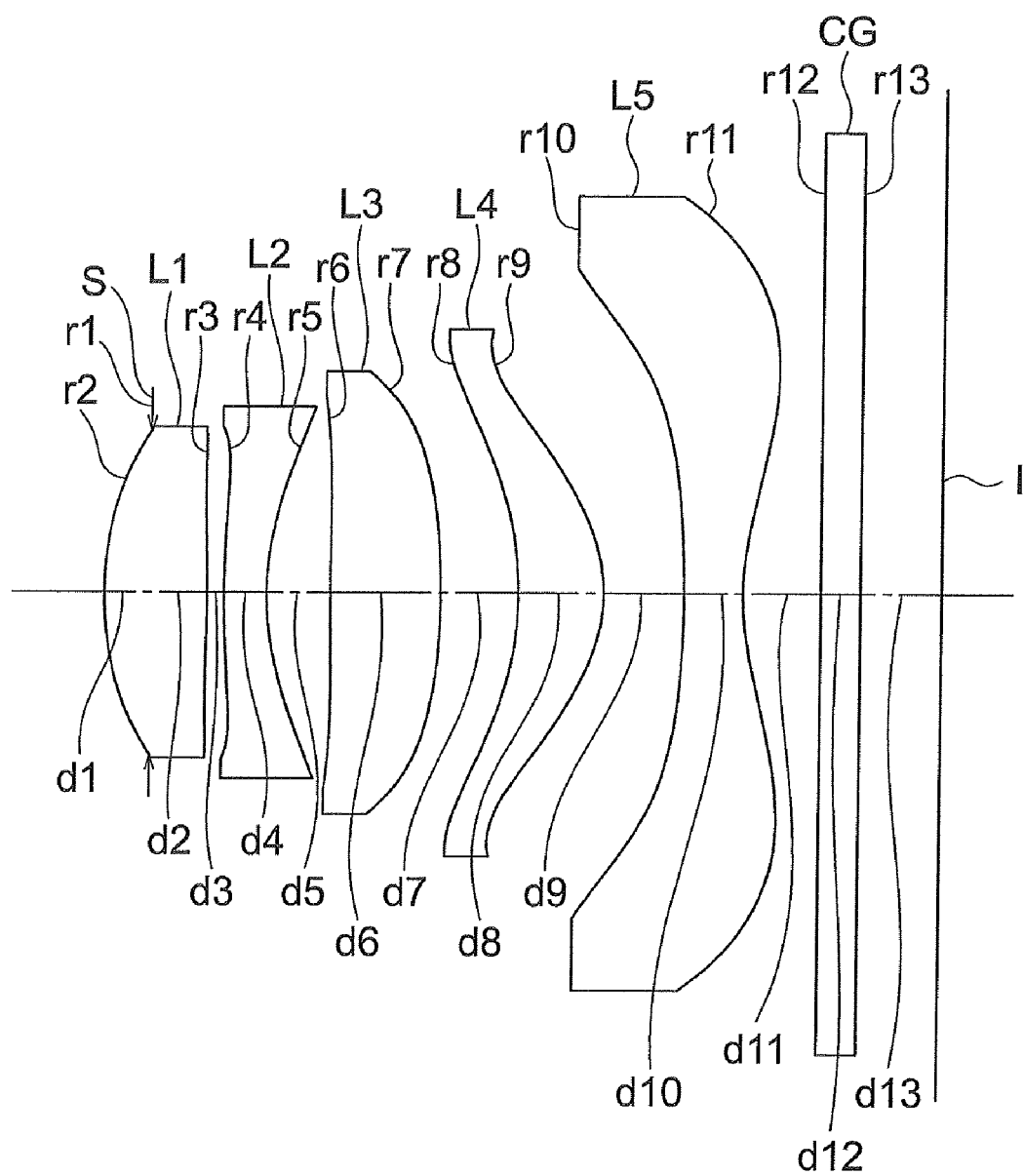
FIG. 1 is a sectional view taken along the optical axis to show the optical structure of an image pickup optical system according to Example 1 of the present invention when achieving focus on an object point at infinity.

Before describing examples, the operation and effects of an image pickup optical system of a preferred embodiment will be described.

The image pickup optical system of the embodiment includes an aperture is placed on the most object side, the image pickup optical system comprises, in order from the object side:

a first lens having a positive refractive power;
a second lens having a negative refractive power;
a third lens having a positive refractive power;
a fourth lens having a positive refractive power; and
a fifth lens having a negative refractive power, and
the following conditional expression is satisfied:

$$-1.49 < (r6+r7)/(r6-r7) < 1.24 \quad (1)$$

where r6 is the paraxial radius of curvature of an object side surface of the third lens, and
r7 is the paraxial radius of curvature of an image plane side surface of the third lens.

Since the aperture stop is placed on the most object side to take an exit pupil away from an image plane, the angle of a light beam incident on a peripheral part of the image pickup device can be made small. This can also lead to reduction in optical length and avoidance of sensitivity reduction in the peripheral part of the image pickup device.

Further, since the position of a principal point is located on the object side of the optical system so that the entire length can be made small enough for the focal length, the entire length can be reduced.

Further, since the image pickup optical system has the five-lens structure with the fourth lens made positive, the divergence of off-axis light flux can be prevented by the fourth lens. This can make the diameter of the final lens small while ensuring the telecentricity of the optical system.

The conditional expression (1) is an expression for defining the shape of the third lens.

If the upper limit of conditional expression (1) is exceeded, the radius of curvature of the object side surface of the third lens becomes large while the radius of curvature of the image side surface becomes small. As a result, spherical aberration is increased and this makes it difficult to correct the aberration. If it is to be a lens of large diameter, the occurrence of spherical aberrations becomes pronounced, and the above correction becomes more difficult.

If the lower limit of conditional expression (1) is exceeded, the radius of curvature of the object side surface of the third lens becomes small. Since the angle of incidence of a light beam onto the object side surface of the third lens becomes large, the correction of coma becomes difficult.

It is preferred to satisfy the following conditional expression (1') instead of the conditional expression (1):

$$-1.12 < (r6+r7)/(r6-r7) < 0.85 \quad (1')$$

It is more preferred to satisfy the following conditional expression (1") instead of the conditional expression (1):

$$-0.97 < (r6+r7)/(r6-r7) < 0.81 \quad (1'')$$

In the examples to be described later, the aperture stop is located on a more object side than the image side surface of the first lens, more specifically, between the object side surface and the image side surface of the first lens. Such an aperture stop position shall be included in the expression that "the aperture stop is placed on the most object side."

It is desired that the image pickup optical system of the embodiment be such that the third lens is formed into a biconvex shape.

If it is to be a lens of large diameter, the occurrence of spherical aberrations becomes pronounced. However, if the third lens is formed into a biconvex shape, it is advantageous in correcting the spherical aberrations (i.e., the aberrations can be corrected properly).

It is also desired that the image pickup optical system of the embodiment be such that the fourth lens is formed into a meniscus shape facing its concave surface toward the object side.

If the fourth lens is formed into a meniscus shape facing its concave surface toward the object side, the angle of incidence of an off-axis light beam onto the lens surface can be made small. As a result, the occurrence of coma can be suppressed.

Further, it is desired that the image pickup optical system of the embodiment should satisfy the following conditional expression (2):

$$0.12 < f1/f3 < 1.04 \quad (2)$$

where f1 is the focal length of the first lens, and
f3 is the focal length of the third lens.

The conditional expression (2) is to define an appropriate power relationship between the first lens L1 and the third lens L3. If the upper limit of conditional expression (2) is exceeded, the refractive power of the third lens L3 becomes large compared with the refractive power of the first lens L1. In this case, longitudinal (on-axis) chromatic aberration and chromatic aberration of magnification produced in the third lens L3 become pronounced, making it difficult to correct the aberrations. This is also unfavorable because the sensitivity of the third lens L3 to manufacturing errors is increased.

In contrast, if the lower limit of conditional expression (2) is exceeded, the refractive power of the first lens L1 becomes large compared with the third lens L3. In this case, coma produced by the first lens L1 to become pronounced, making it difficult to correct the aberration. This is also unfavorable because the sensitivity of the first lens L1 to manufacturing errors becomes pronounced.

It is preferred to satisfy the following condition:

$$0.16 < f1/f3 < 0.68 \quad (2')$$

It is more preferred to satisfy the following condition:

$$0.18 < f1/f3 < 0.52 \quad (2'')$$

Further, it is desired that the image pickup optical system of the embodiment should satisfy the following conditional expression (3):

$$-9.37 < r9/d9 < -0.88 \quad (3)$$

where
r9 is the paraxial radius of curvature of an image plane side surface of the fourth lens, and
d9 is air space between the fourth lens and the fifth lens on the optical axis.

The conditional expression (3) is an expression for defining an appropriate ratio of the radius of curvature of the image plane side surface of the fourth lens to the air space between the fourth lens and the fifth lens on the optical axis. If the conditional expression (3) is satisfied, aberrations can be corrected properly.

If the lower limit of conditional expression (3) is exceeded, the radius of curvature of the image plane side surface of the fourth lens becomes small. In this case, the angle of a light beam incident on the image plane side surface of the fourth lens becomes large, resulting in the occurrence of coma and insufficient correction of astigmatism.

Suppose that an air lens exists between the fourth lens and the fifth lens. If the upper limit of conditional expression (3) is exceeded, the air space between the fourth lens and the fifth lens becomes small. In this case, the power of this air lens becomes small, and this is unfavorable for correcting the curvature of field and distortion (i.e., the curvature of field and distortion cannot be corrected sufficiently).

It is preferred to satisfy the following conditional expression (3') instead of the conditional expression (3):

$$-7.03 < r9/d9 < -1.17 \quad (3')$$

It is more preferred to satisfy the following conditional expression (3") instead of the conditional expression (3):

$$-6.09 < r9/d9 < -1.35 \quad (3'')$$

Further, it is desired that the image pickup optical system of the embodiment should satisfy the following conditional expression (4):

$$0.31 < f1/f < 1.91 \quad (4)$$

where
f1 is the focal length of the first lens, and
f is the focal length of the entire image pickup optical system.

If the conditional expression (4) is satisfied, the entire length can be reduced to correct aberrations properly.

If the upper limit of conditional expression (4) is exceeded, the refractive power of the first lens becomes strong. This worsens various aberrations, especially spherical aberrations because the height of marginal rays is high, thereby making it difficult to correct the aberrations. Further, the entire refractive power is concentrated on the first lens. This is unfavorable because the sensitivity of the first lens to manufacturing errors is increased.

If the lower limit of conditional expression (4) is exceeded, the refractive power of the first lens becomes small. This makes it difficult to locate the position of the principal point on the object side of the optical system, and hence to reduce the entire length.

It is preferred to satisfy the following conditional expression (4') instead of the conditional expression (4):

$$0.42 < f1/f < 0.95 \quad (4')$$

It is more preferred to satisfy the following conditional expression (4") instead of the conditional expression (4):

$$0.63 < f1/f < 0.95 \quad (4'')$$

Further, it is desired that the image pickup optical system of the embodiment should satisfy the following conditional expression (5):

$$1.51 < \phi L5\max/\phi st < 7.37 \quad (5)$$

where
$\phi L5\max$ is the radius of the most image plane side lens, and
$\Phi st$ is the radius of the aperture stop.

The conditional expression (5) is to define a ratio between the lens diameter on the most image plane side and the aperture diameter.

If the upper limit of conditional expression (5) is exceeded, the diameter of the lens (final lens) on the most image plane side becomes larger than the diameter of the aperture, and this is advantageous to ensure the telecentricity but unfavorable for downsizing.

If the lower limit of conditional expression (5) is exceeded, the diameter of the final lens becomes smaller than the diameter of the aperture. In this case, a space between axial light flux on the lens on the most image plane side and off-axis light flux becomes narrow, and this makes it difficult to correct coma and distortions, especially the curvature of field.

It is preferred to satisfy the following conditional expression (5') instead of the conditional expression (5):

$$2.01 < \phi L5\max/\phi st < 5.53 \quad (5')$$

It is more preferred to satisfy the following conditional expression (5") instead of the conditional expression (5):

$$2.32 < \phi L5\max/\phi st < 4.79 \quad (5'')$$

Further, it is desired that the image pickup optical system of the embodiment should satisfy the following conditional expression (6):

$$1.00 < \phi L5edmax/\phi st < 5.55 \quad (6)$$

where
$\phi L5edmax$ is the effective aperture on the most image plane side lens, and
$\phi st$ is the diameter of the aperture.

It is preferred to satisfy the following conditional expression (6') instead of the conditional expression (6):

$$1.34 < \phi L5edmax/\phi st < 4.16 \quad (6')$$

It is more preferred to satisfy the following conditional expression (6") instead of the conditional expression (6):

$$1.82 < \phi L5edmax/\phi st < 3.05 \quad (6'')$$

Further, it is desired that the image pickup optical system of the embodiment be such that the object side surface of the fifth lens is formed into a concave shape.

If the object side surface of the fifth lens is formed into a concave shape, the telecentricity can be ensured. Further, the angle of incidence of a light beam onto the object side surface of the fifth lens becomes small, and this is advantageous in correcting the curvature of field and distortions.

Further, it is desired that the image pickup optical system of the embodiment be such that the first lens, the second lens, the third lens, the fourth lens, and the fifth lens are all made of resin.

Use of resin can lead to providing an inexpensive image pickup lens.

An image pickup apparatus of the embodiment includes:
the above-mentioned image pickup optical system, and
an electronic image pickup device having an image pickup plane.

Thus, a relatively small, sophisticated image pickup optical system, in which spherical aberration, astigmatism, curvature of field, chromatic aberration of magnification, coma, and the like are corrected properly, and an image pickup apparatus having the same can be obtained.

It is also desired that image pickup apparatus of the embodiment should further comprise an autofocus mechanism integrated into the image pickup optical system.

If the autofocus mechanism is incorporated, focus can be achieved at all object distances.

Further, it is desired that the image pickup apparatus of the embodiment be such that the image pickup optical system and the electronic image pickup device are integrated as a unit.

If the electronic image pickup device is integrated as a unit, an optical image produced by the image pickup optical system can be converted to an electric signal.

Examples of the image pickup optical system and the electronic image pickup apparatus of the embodiment will be described with reference to the accompanying drawings. Note that these examples are not intended to limit this invention. The positive or negative of the refractive power is based on the paraxial radius of curvature. Further, the aperture stop is placed on the most object side. However, as mentioned above, the aperture stop is located on a more object side than the image side surface of the first lens, more specifically, between the object side surface and the image side surface of a first lens L1.

Next, an image pickup optical system according to Example 1 will be described. FIG. 1 is a sectional view taken along the optical axis to show the optical structure of an image pickup optical system according to Example 1 when achieving focus on an object point at infinity.

Figure 2:
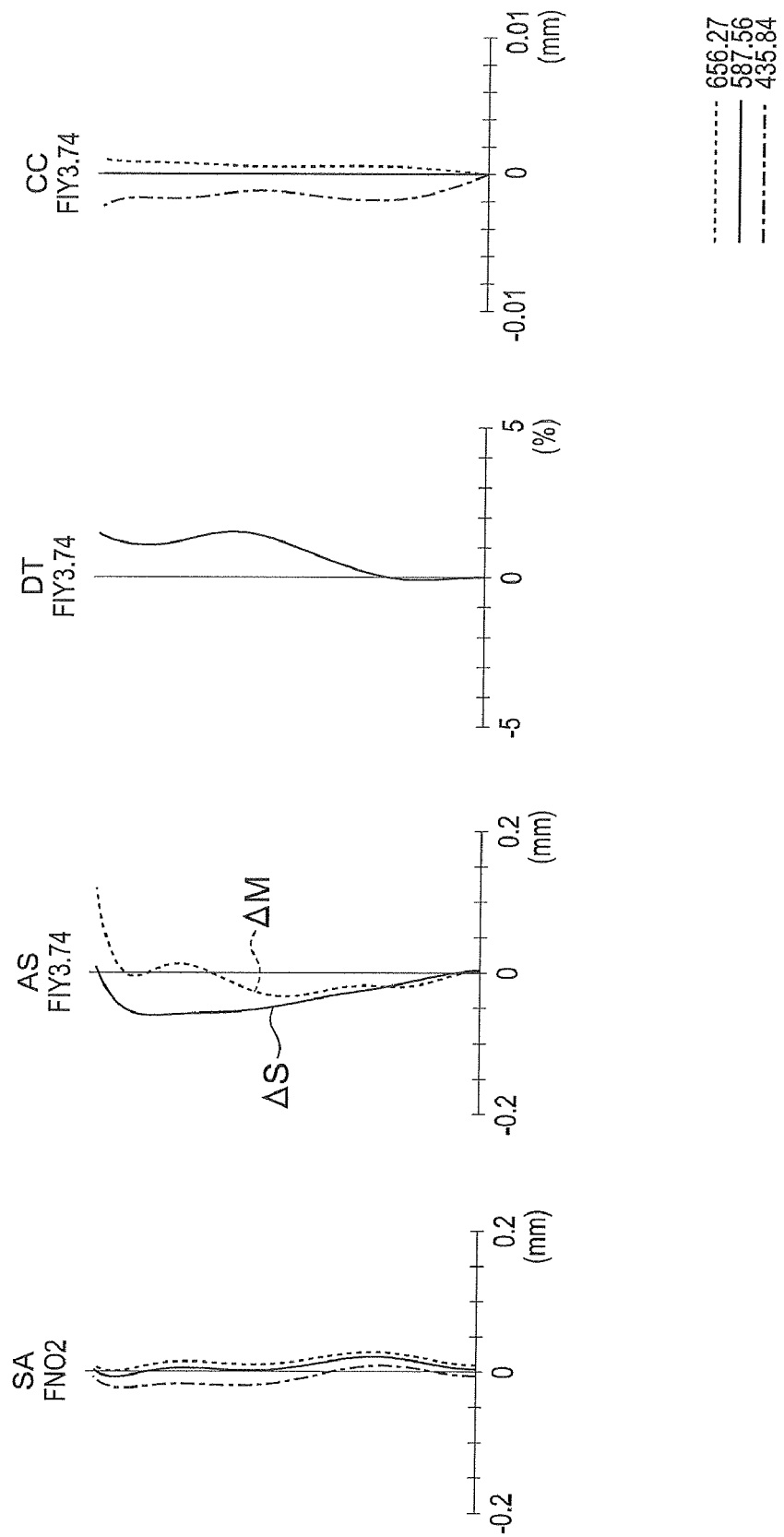
FIG. 2 is a diagram showing spherical aberration (SA), astigmatism (AS), distortion (DT), and chromatic aberration of magnification (CC) when the image pickup optical system according to Example 1 focuses on the object point at infinity.

FIG. 2 is a diagram showing spherical aberration (SA), astigmatism (AS), distortion (DT), and chromatic aberration of magnification (CC) when the image pickup optical system according to Example 1 focuses on the object point at infinity. Note that FIY is image height, and symbols in the aberration diagrams are commonly used in the other examples to be described later.

As shown in FIG. 1, the image pickup optical system of Example 1 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power. Note that, in all the examples to be described later, CG is a cover glass and I is the image pickup plane of the electronic image pickup device in the lens sectional views.

The first lens L1 is a biconvex positive lens. The second lens L2 is a negative meniscus lens facing its convex surface toward the object side. The third lens L3 is a biconvex positive lens. The fourth lens L4 is a positive meniscus lens facing its convex surface toward the image plane side. The fifth lens L5 is a biconcave negative lens.

Aspheric surfaces are provided on both sides of all the lenses from the first lens L1 to the fifth lens L5.

Figure 3:
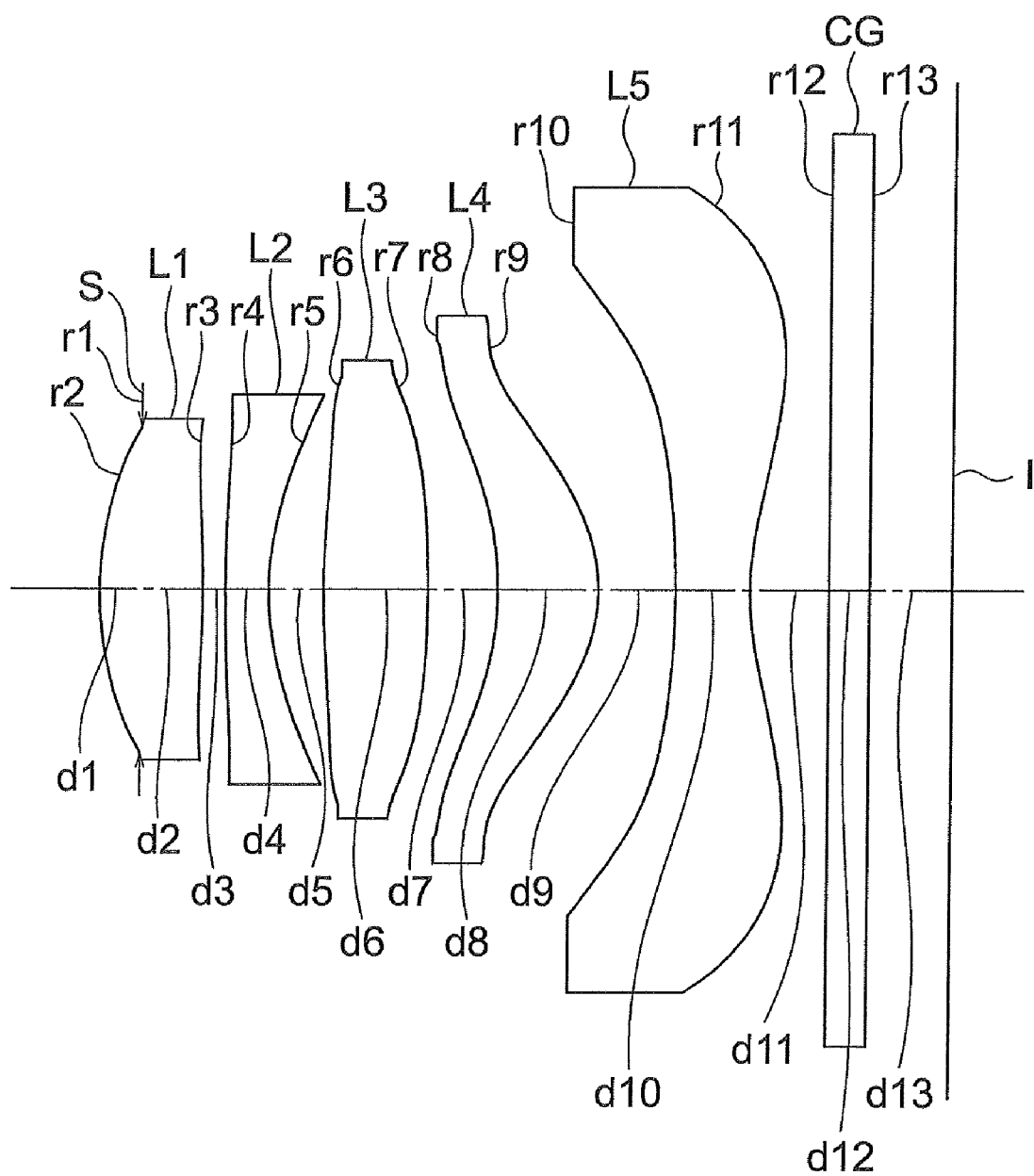
FIG. 3 is a sectional view taken along the optical axis to show the optical structure of an image pickup optical system according to Example 2 of the present invention when achieving focus on an object point at infinity.

Next, an image pickup optical system according to Example 2 will be described. FIG. 3 is a sectional view taken along the optical axis to show the optical structure of an image pickup optical system according to Example 2 when achieving focus on an object point at infinity.

Figure 4:
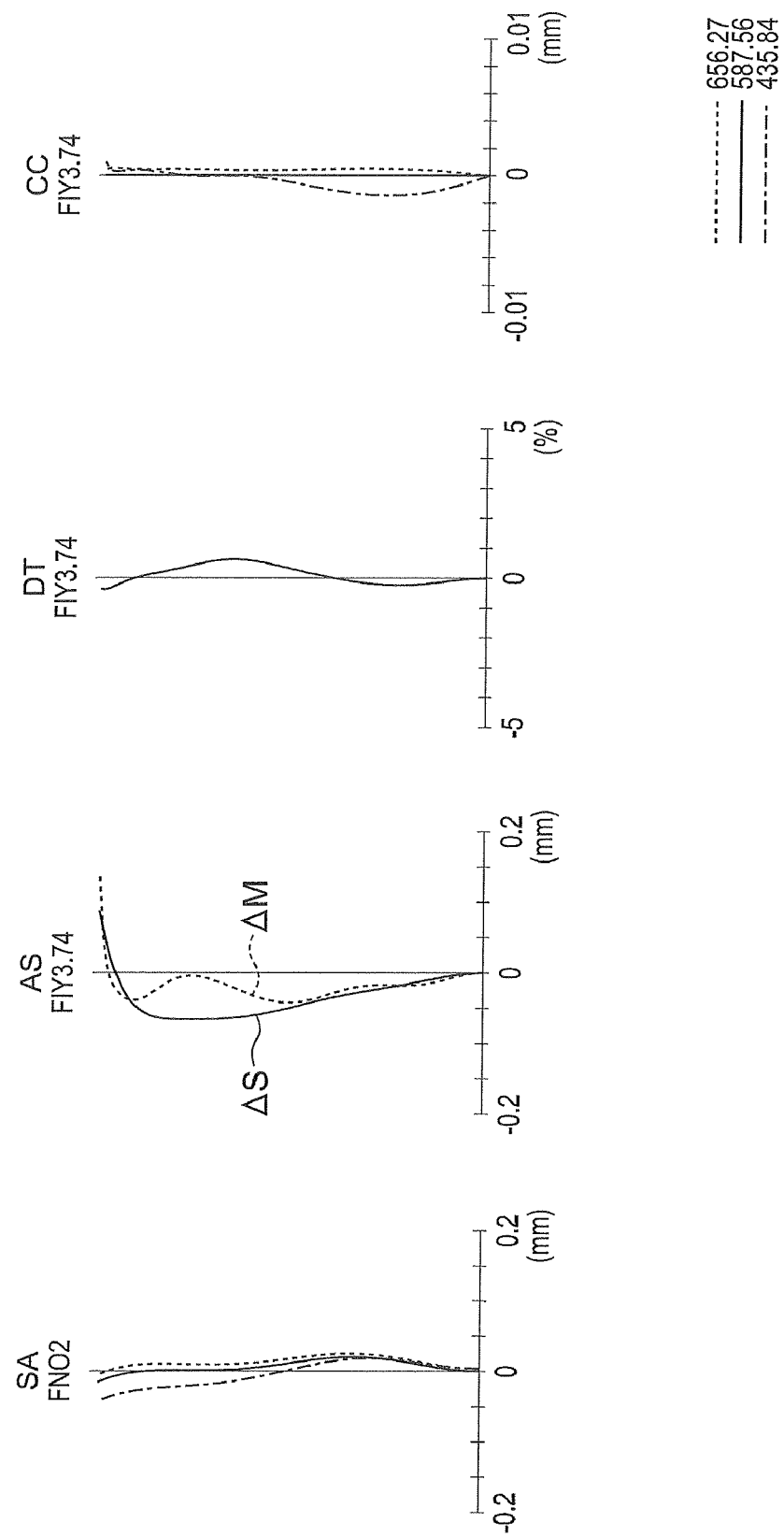
FIG. 4 is a diagram showing spherical aberration (SA), astigmatism (AS), distortion (DT), and chromatic aberration of magnification (CC) when the image pickup optical system according to Example 2 focuses on the object point at infinity.

FIG. 4 is a diagram showing spherical aberration (SA), astigmatism (AS), distortion (DT), and chromatic aberration of magnification (CC) when the image pickup optical system according to Example 2 focuses on the object point at infinity.

As shown in FIG. 3, the image pickup optical system of Example 2 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a negative meniscus lens facing its convex surface toward the object side. The third lens L3 is a biconvex positive lens. The fourth lens L4 is a positive meniscus lens facing its convex surface toward the image plane side. The fifth lens L5 is a biconcave negative lens.

Aspheric surfaces are provided on both sides of all the lenses from the first lens L1 to the fifth lens L5.

Figure 5:
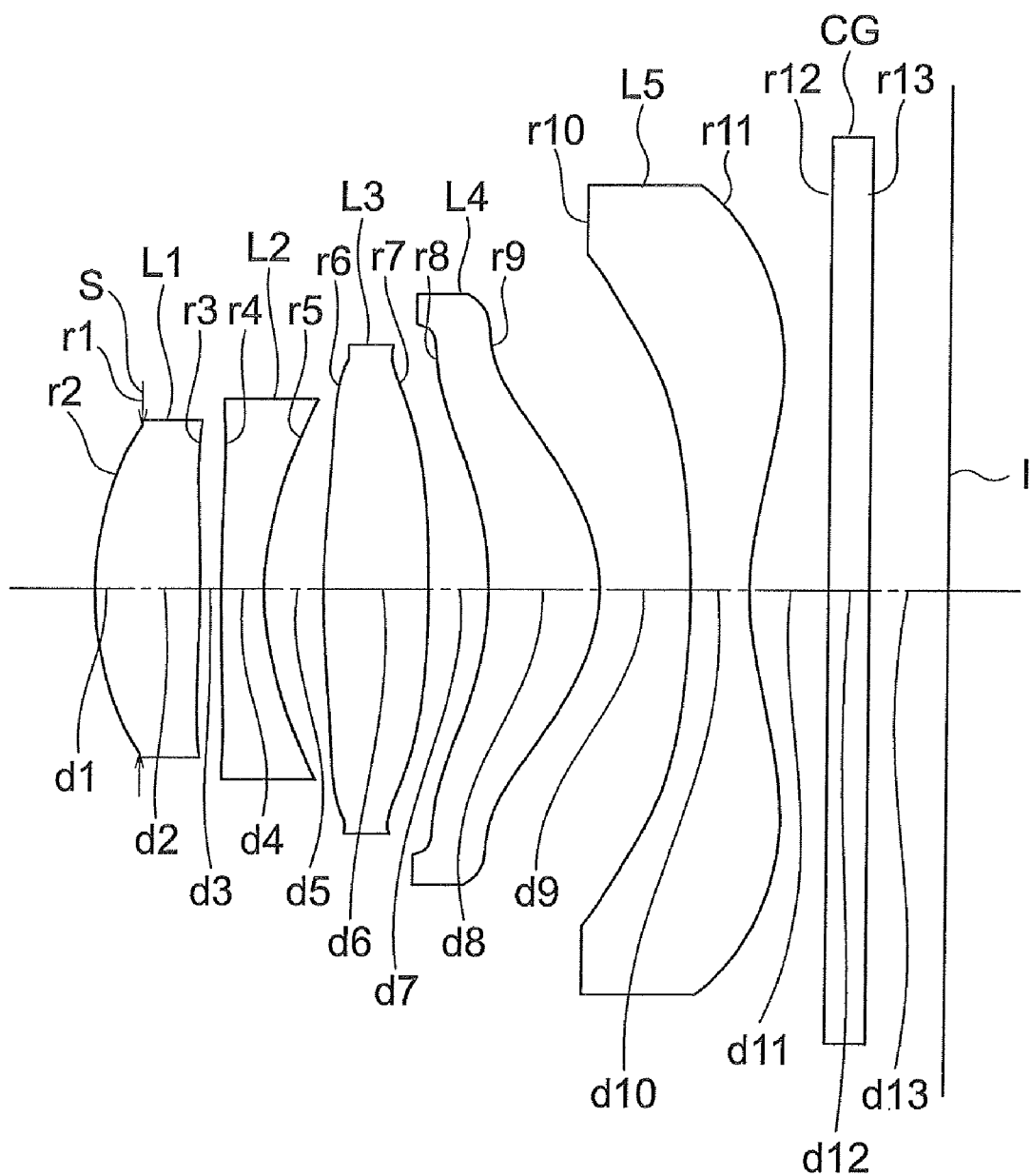
FIG. 5 is a sectional view taken along the optical axis to show the optical structure of an image pickup optical system according to Example 3 of the present invention when achieving focus on an object point at infinity.

Next, an image pickup optical system according to Example 3 will be described. FIG. 5 is a sectional view taken along the optical axis to show the optical structure of an image pickup optical system according to Example 3 when achieving focus on an object point at infinity.

Figure 6:
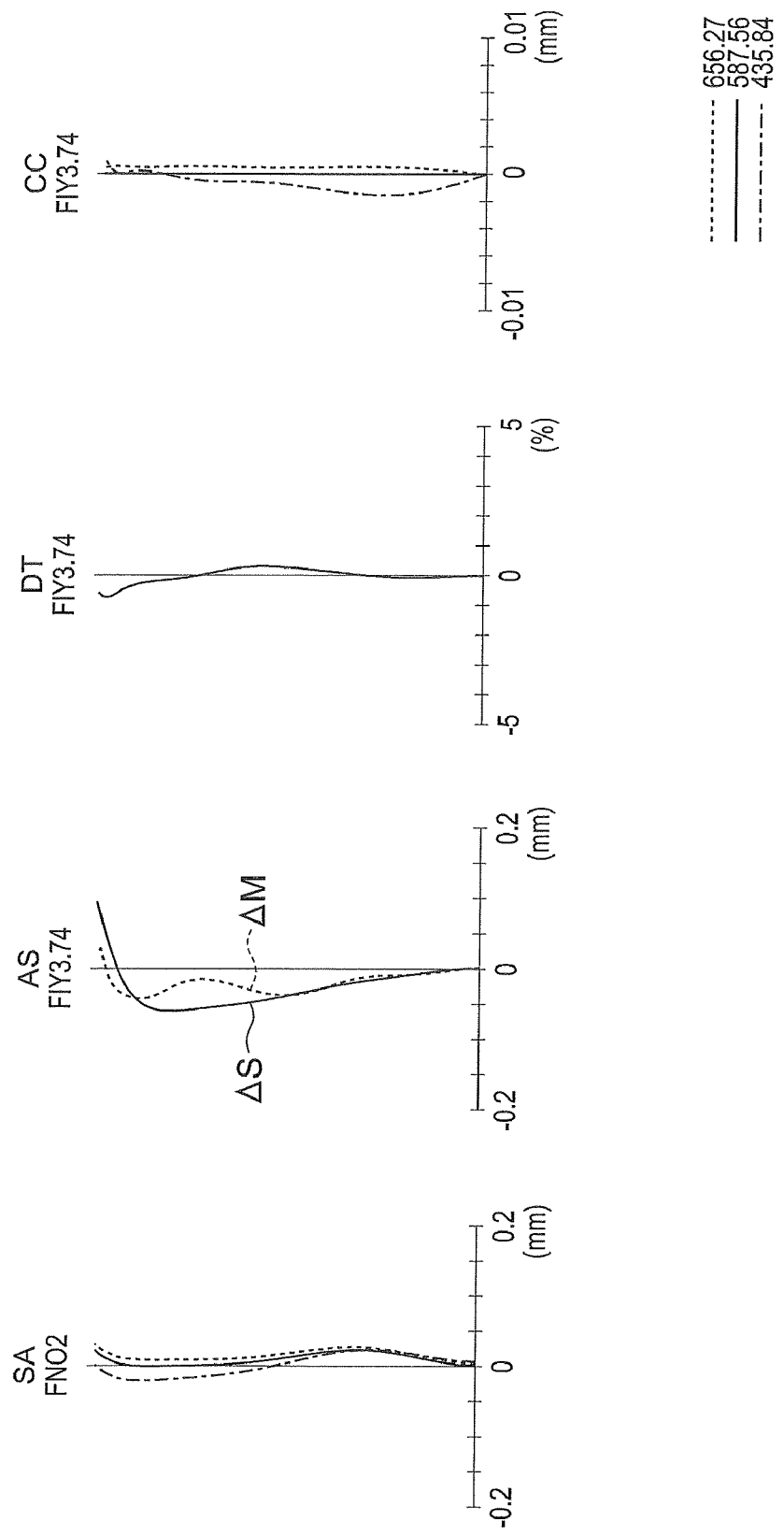
FIG. 6 is a diagram showing spherical aberration (SA), astigmatism (AS), distortion (DT), and chromatic aberration of magnification (CC) when the image pickup optical system according to Example 3 focuses on the object point at infinity.

FIG. 6 is a diagram showing spherical aberration (SA), astigmatism (AS), distortion (DT), and chromatic aberration of magnification (CC) when the image pickup optical system according to Example 3 focuses on the object point at infinity.

As shown in FIG. 5, the image pickup optical system of Example 3 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a negative meniscus lens facing its convex surface toward the object side. The third lens L3 is a biconvex positive lens. The fourth lens L4 is a positive meniscus lens facing its convex surface toward the image plane side. The fifth lens L5 is a biconcave negative lens.

Aspheric surfaces are provided on both sides of all the lenses from the first lens L1 to the fifth lens L5.

Figure 7:
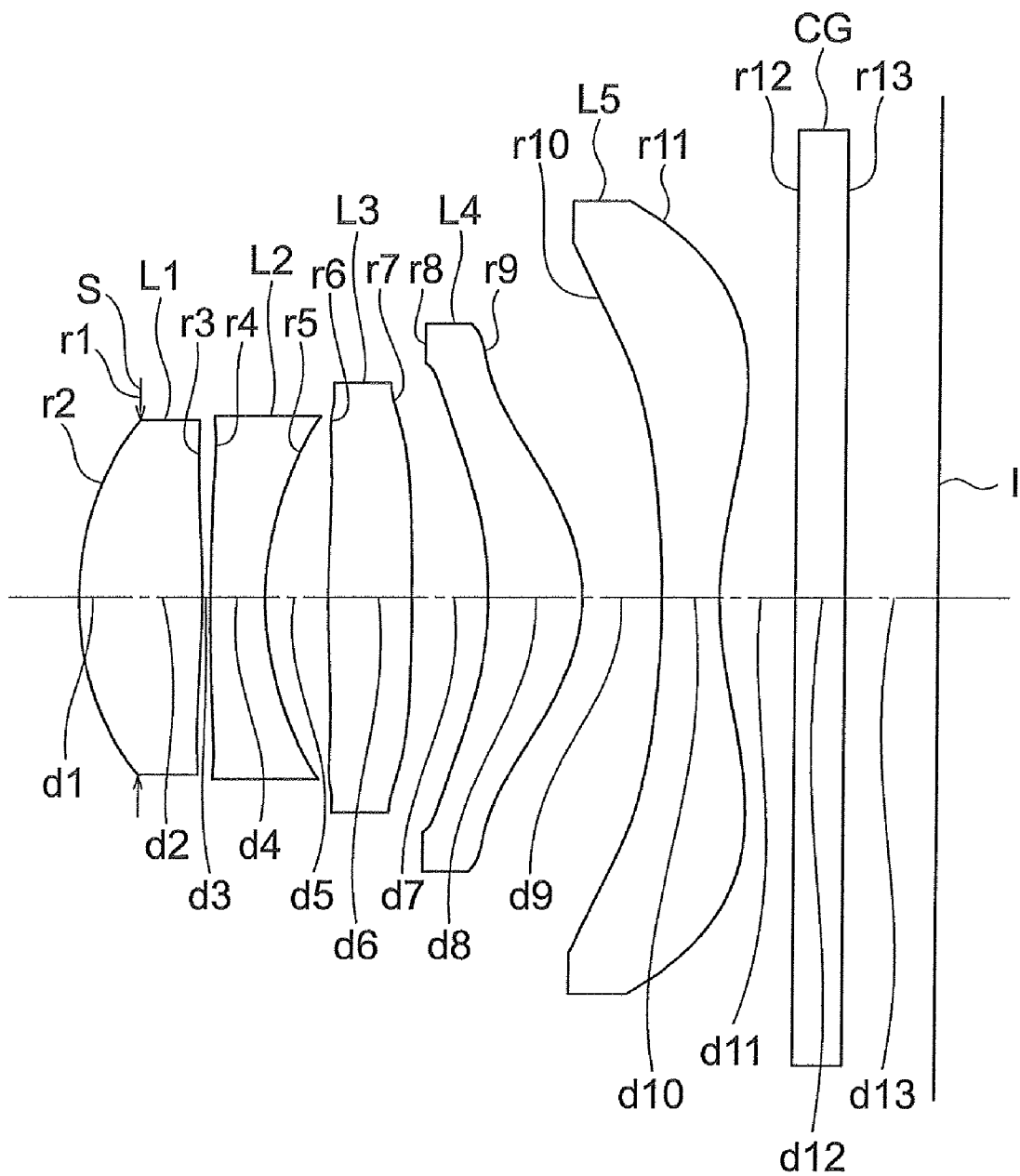
FIG. 7 is a sectional view taken along the optical axis to show the optical structure of an image pickup optical system according to Example 4 of the present invention when achieving focus on an object point at infinity.

Next, an image pickup optical system according to Example 4 will be described. FIG. 7 is a sectional view taken along the optical axis to show the optical structure of an image pickup optical system according to Example 4 when achieving focus on an object point at infinity.

Figure 8:
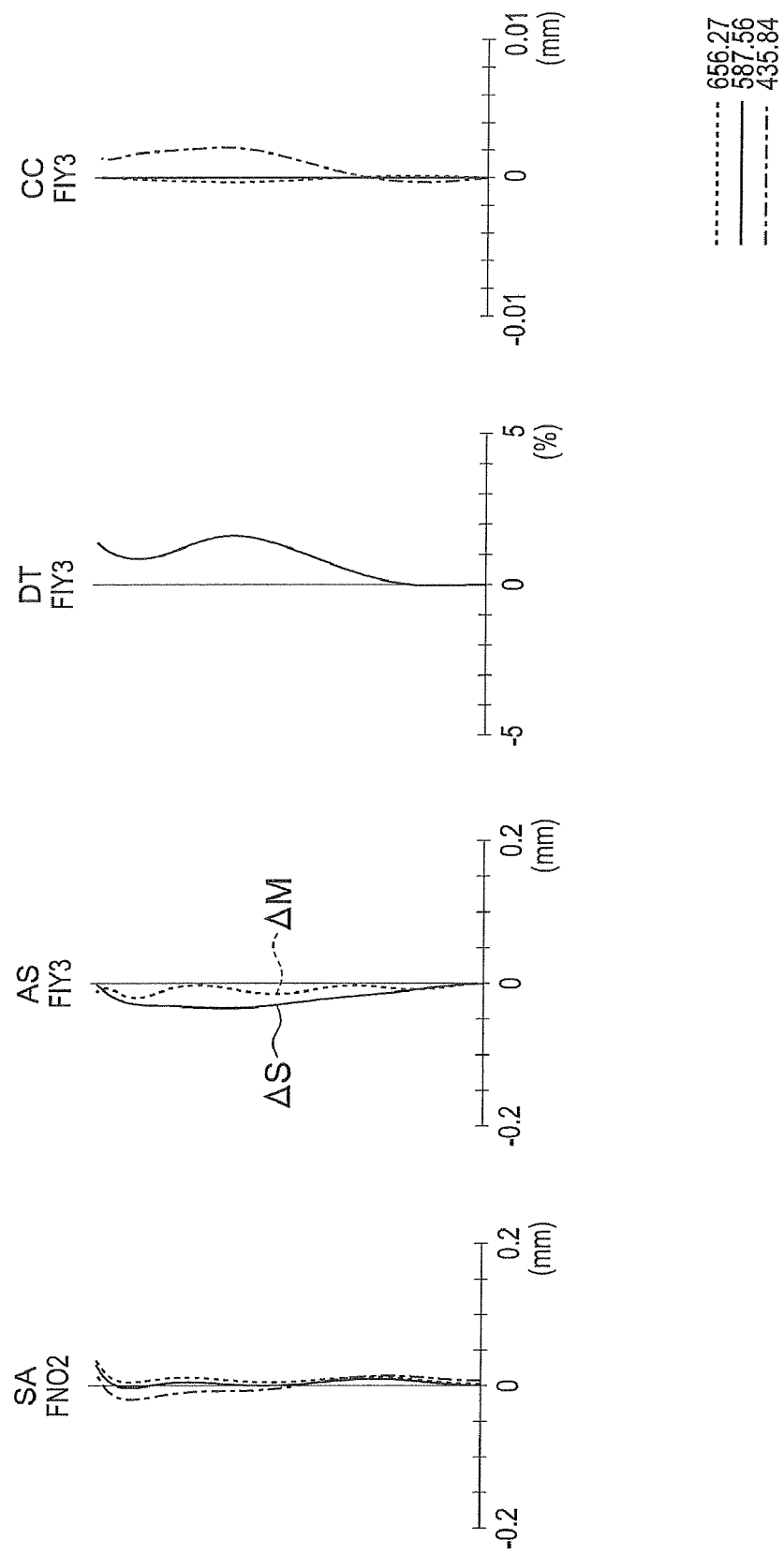
FIG. 8 is a diagram showing spherical aberration (SA), astigmatism (AS), distortion (DT), and chromatic aberration of magnification (CC) when the image pickup optical system according to Example 4 focuses on the object point at infinity.

FIG. 8 is a diagram showing spherical aberration (SA), astigmatism (AS), distortion (DT), and chromatic aberration of magnification (CC) when the image pickup optical system according to Example 4 focuses on the object point at infinity.

As shown in FIG. 7, the image pickup optical system of Example 4 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a negative meniscus lens facing its convex surface toward the object side. The third lens L3 is a biconvex positive lens. The fourth lens L4 is a positive meniscus lens facing its convex surface toward the image plane side. The fifth lens L5 is a biconcave negative lens.

Aspheric surfaces are provided on both sides of all the lenses from the first lens L1 to the fifth lens L5.

Figure 9:
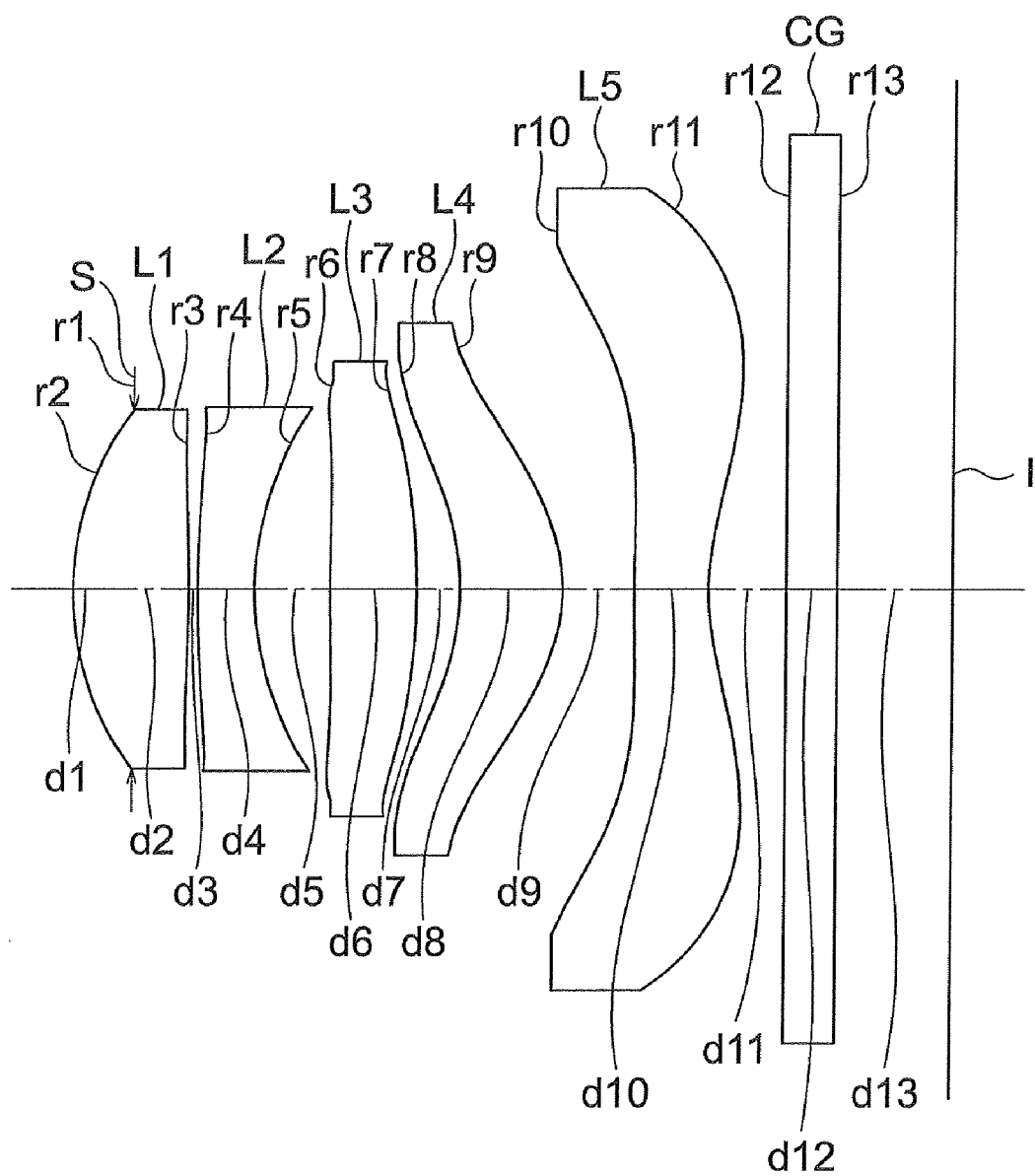
FIG. 9 is a sectional view taken along the optical axis to show the optical structure of an image pickup optical system according to Example 5 of the present invention when achieving focus on an object point at infinity.

Next, an image pickup optical system according to Example 5 will be described. FIG. 9 is a sectional view taken along the optical axis to show the optical structure of an image pickup optical system according to Example 5 when achieving focus on an object point at infinity.

Figure 10:
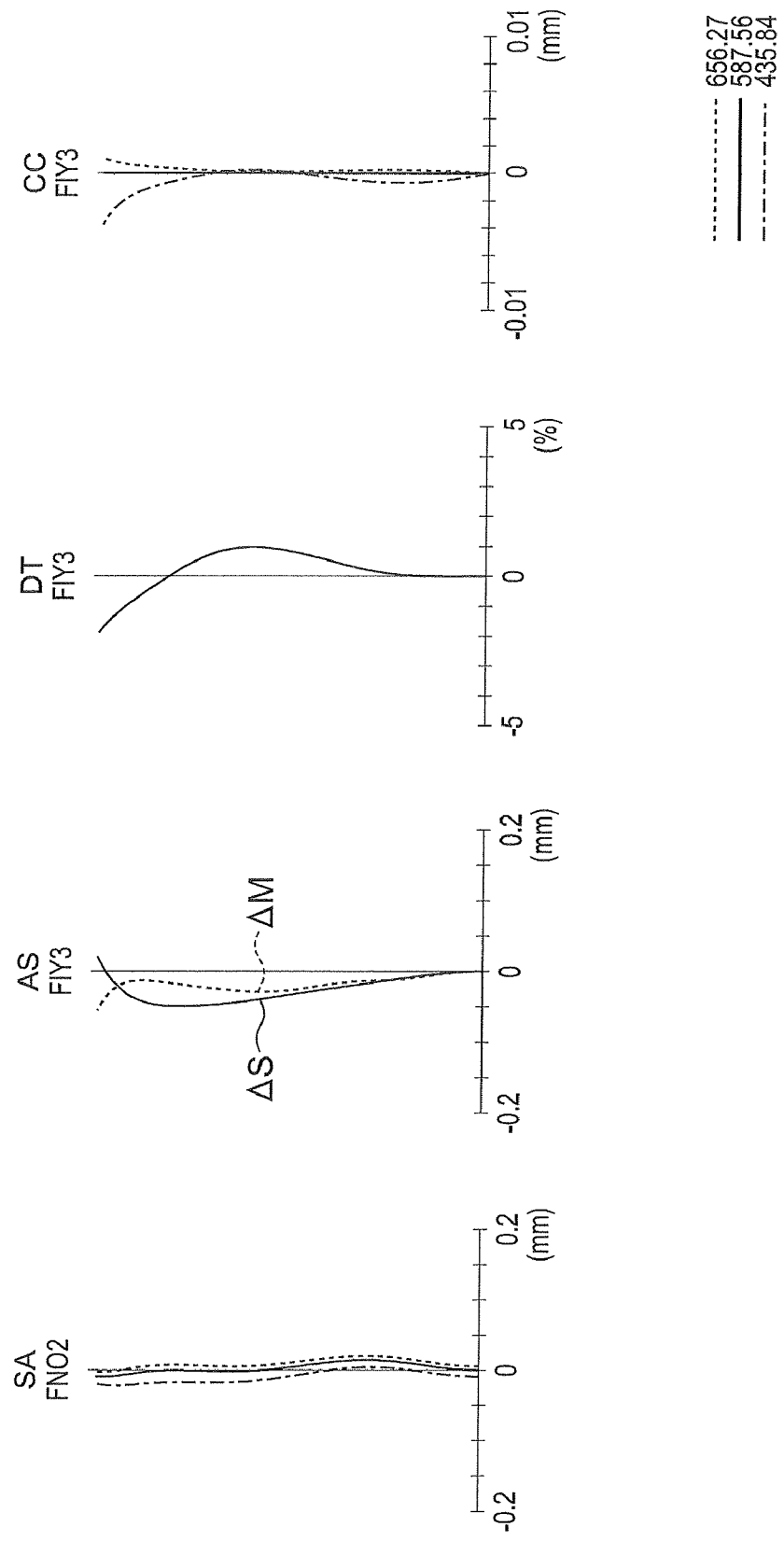
FIG. 10 is a diagram showing spherical aberration (SA), astigmatism (AS), distortion (DT), and chromatic aberration of magnification (CC) when the image pickup optical system according to Example 5 focuses on the object point at infinity.

FIG. 10 is a diagram showing spherical aberration (SA), astigmatism (AS), distortion (DT), and chromatic aberration of magnification (CC) when the image pickup optical system according to Example 5 focuses on the object point at infinity.

As shown in FIG. 9, the image pickup optical system of Example 5 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a negative meniscus lens facing its convex surface toward the object side. The third lens L3 is a biconvex positive lens. The fourth lens L4 is a positive meniscus lens facing its convex surface toward the image plane side. The fifth lens L5 is a negative meniscus lens facing its convex surface toward the object side.

Aspheric surfaces are provided on both sides of all the lenses from the first lens L1 to the fifth lens L5.

Figure 11:
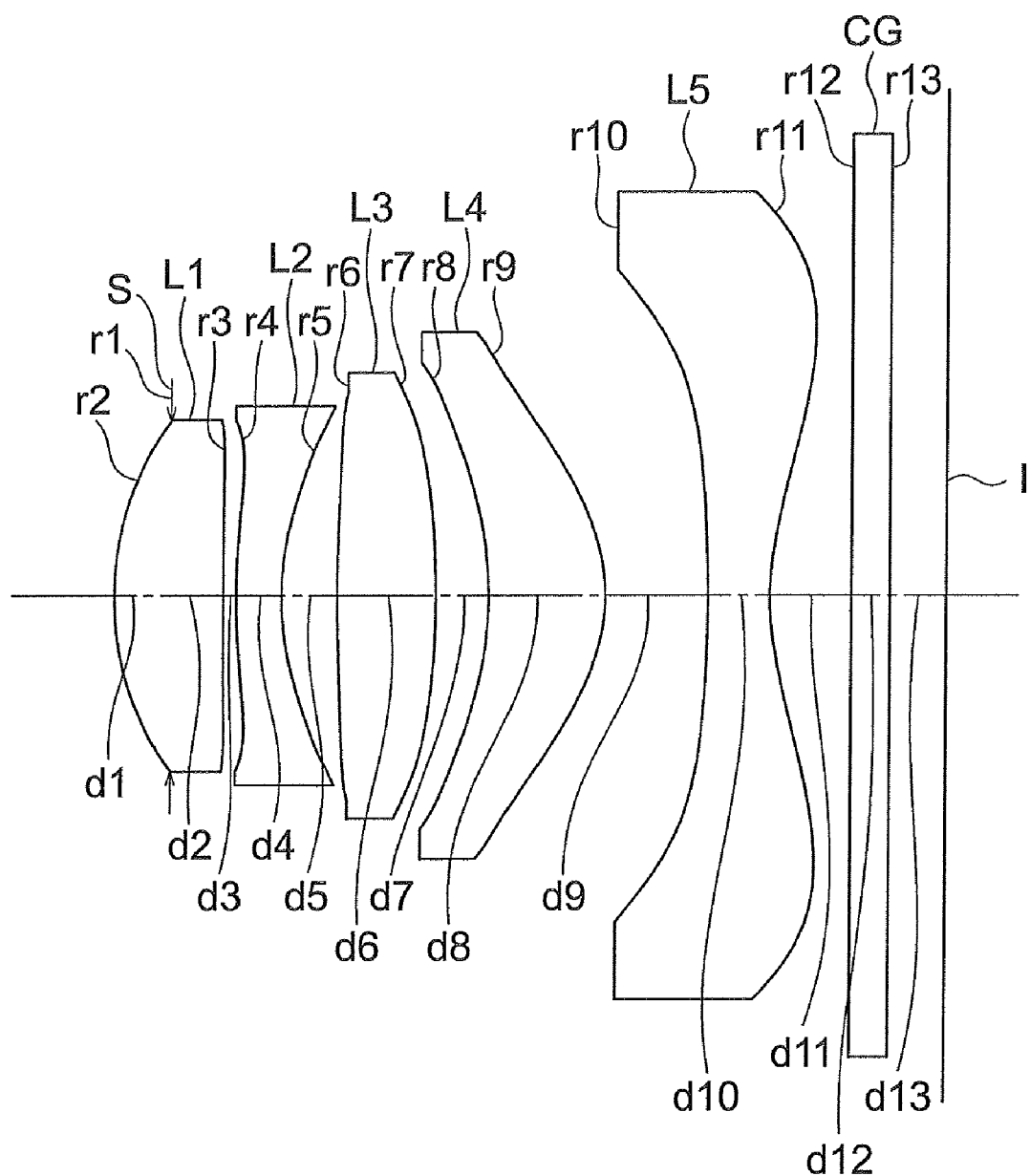
FIG. 11 is a sectional view taken along the optical axis to show the optical structure of an image pickup optical system according to Example 6 of the present invention when achieving focus on an object point at infinity.

Next, an image pickup optical system according to Example 6 will be described. FIG. 11 is a sectional view taken along the optical axis to show the optical structure of an image pickup optical system according to Example 6 when achieving focus on an object point at infinity.

Figure 12:
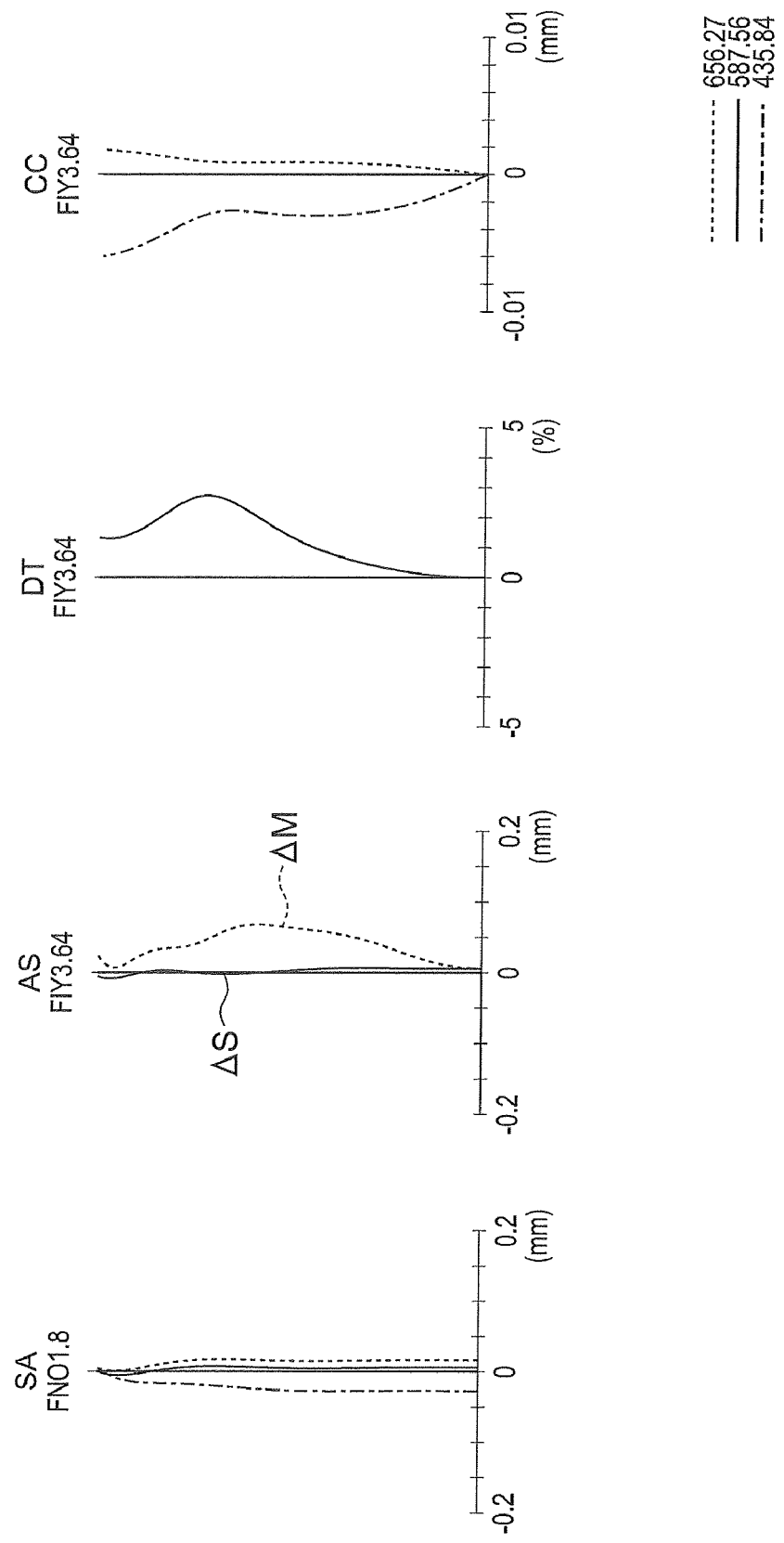
FIG. 12 is a diagram showing spherical aberration (SA), astigmatism (AS), distortion (DT), and chromatic aberration of magnification (CC) when the image pickup optical system according to Example 6 focuses on the object point at infinity.

FIG. 12 is a diagram showing spherical aberration (SA), astigmatism (AS), distortion (DT), and chromatic aberration of magnification (CC) when the image pickup optical system according to Example 6 focuses on the object point at infinity.

As shown in FIG. 11, the image pickup optical system of Example 6 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a positive meniscus lens facing its convex surface toward the object side. The second lens L2 is a negative meniscus lens facing its convex surface toward the object side. The third lens L3 is a biconvex positive lens. The fourth lens L4 is a positive meniscus lens facing its convex surface toward the image plane side. The fifth lens L5 is a biconcave negative lens.

Aspheric surfaces are provided on both sides of all the lenses from the first lens L1 to the fifth lens L5.

Figure 13:
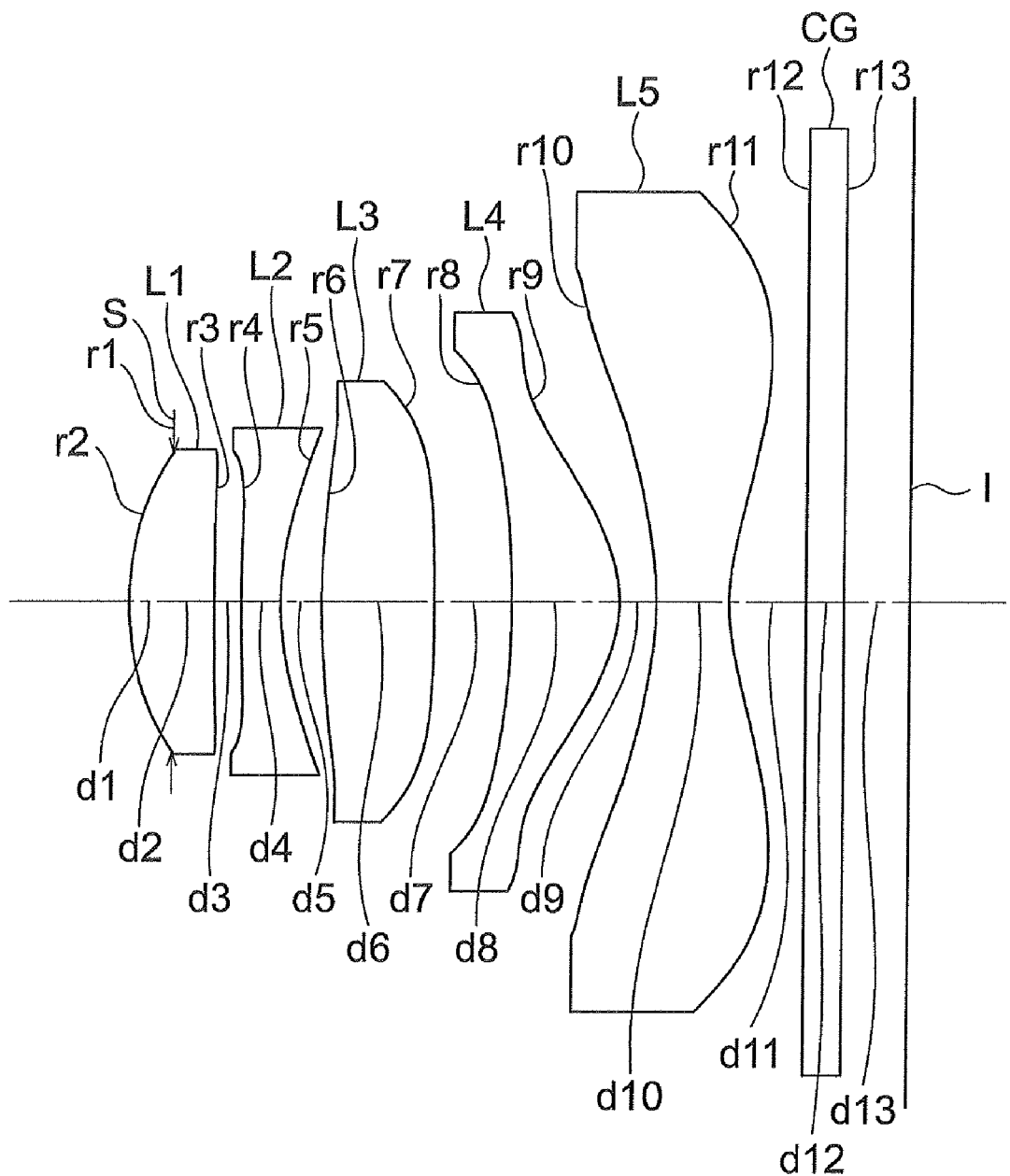
FIG. 13 is a sectional view taken along the optical axis to show the optical structure of an image pickup optical system according to Example 7 of the present invention when achieving focus on an object point at infinity.

Next, an image pickup optical system according to Example 7 will be described. FIG. 13 is a sectional view taken along the optical axis to show the optical structure of an image pickup optical system according to Example 7 when achieving focus on an object point at infinity.

Figure 14:
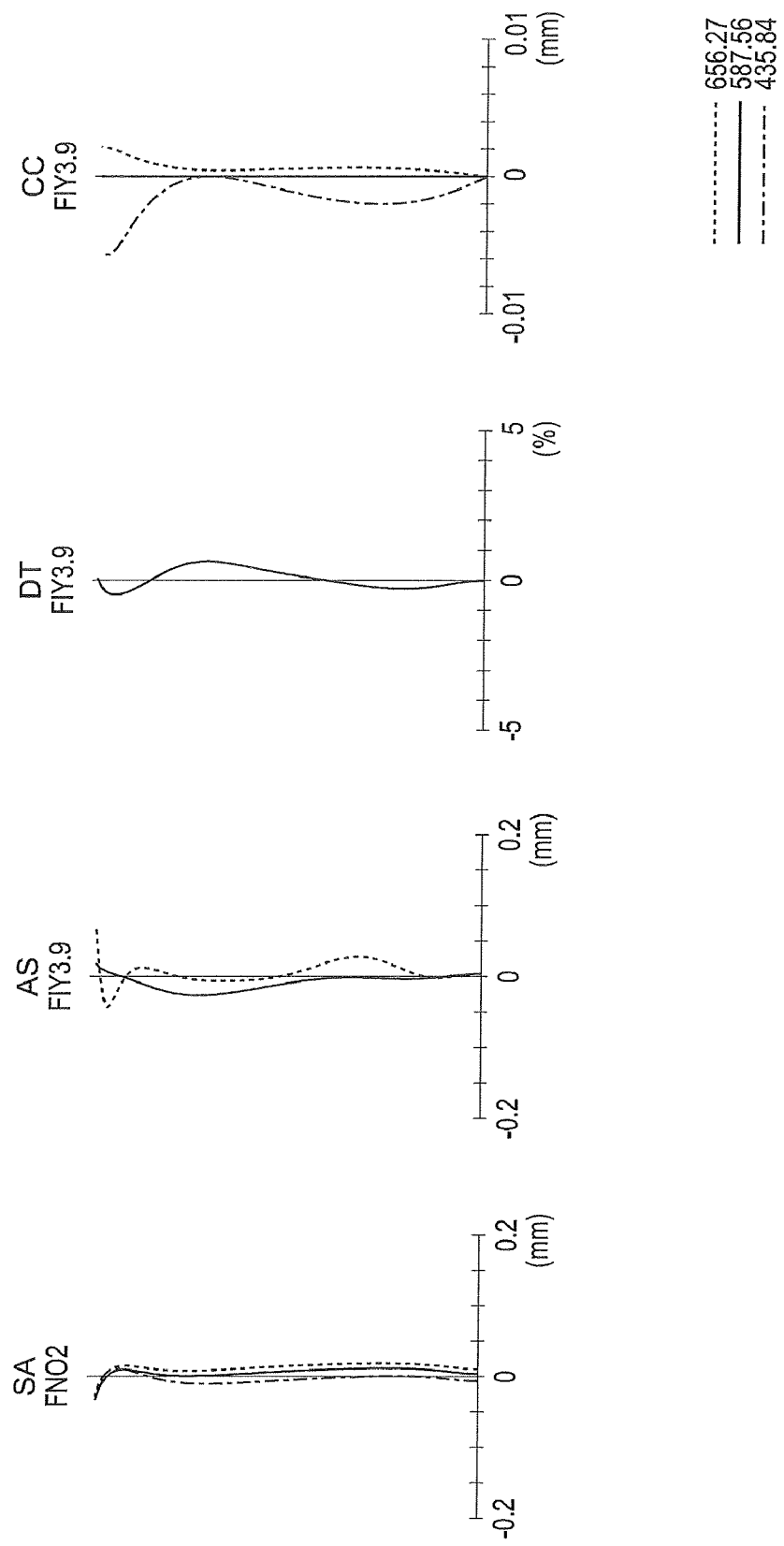
FIG. 14 is a diagram showing spherical aberration (SA), astigmatism (AS), distortion (DT), and chromatic aberration of magnification (CC) when the image pickup optical system according to Example 7 focuses on the object point at infinity.

FIG. 14 is a diagram showing spherical aberration (SA), astigmatism (AS), distortion (DT), and chromatic aberration of magnification (CC) when the image pickup optical system according to Example 7 focuses on the object point at infinity.

As shown in FIG. 13, the image pickup optical system of Example 7 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a negative meniscus lens facing its convex surface toward the object side. The third lens L3 is a biconvex positive lens. The fourth lens L4 is a positive meniscus lens facing its convex surface toward the image plane side. The fifth lens L5 is a biconcave negative lens.

Aspheric surfaces are provided on both sides of all the lenses from the first lens L1 to the fifth lens L5.

Figure 15:
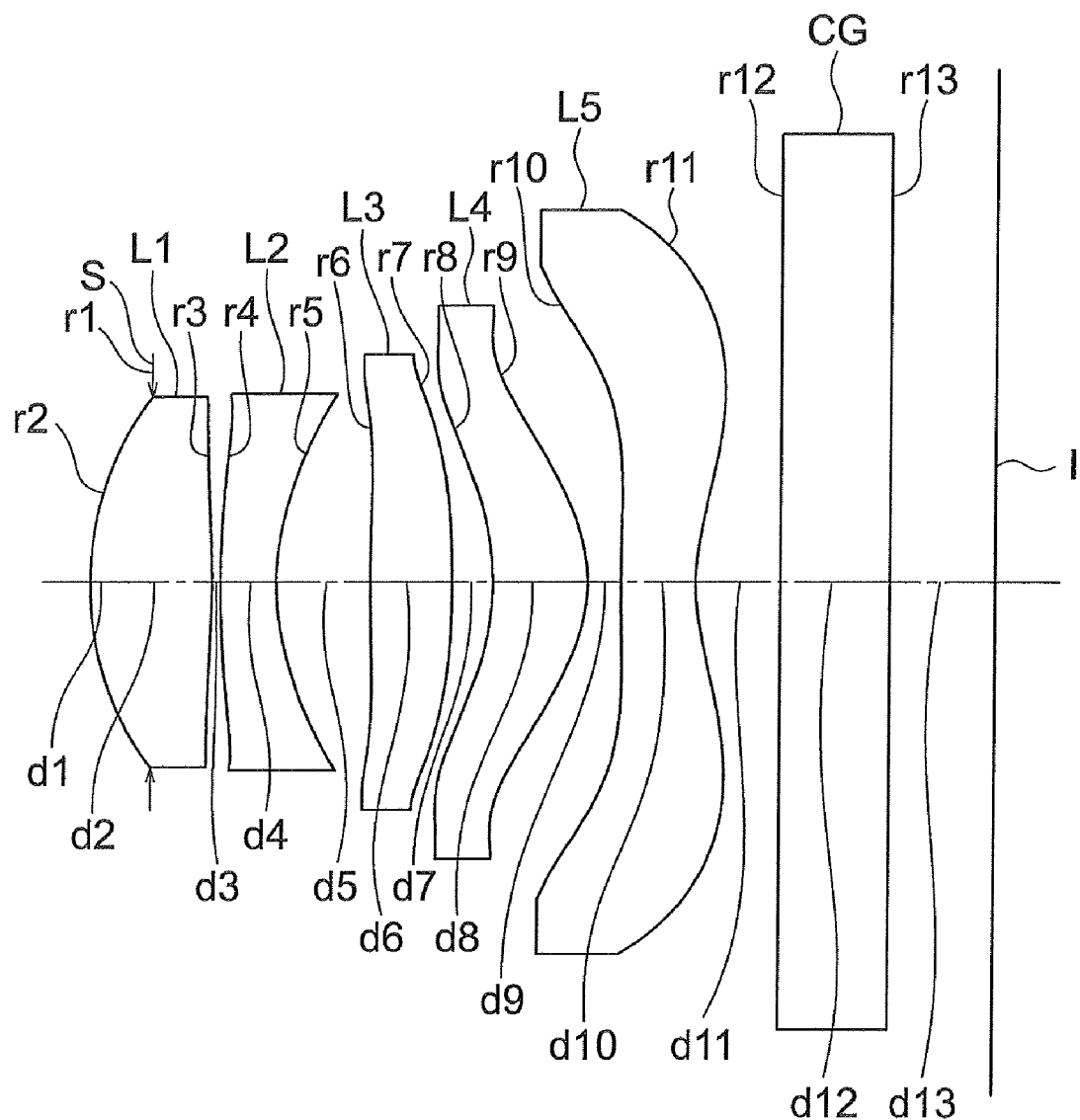
FIG. 15 is a sectional view taken along the optical axis to show the optical structure of an image pickup optical system according to Example 8 of the present invention when achieving focus on an object point at infinity.

Next, an image pickup optical system according to Example 8 will be described. FIG. 15 is a sectional view taken along the optical axis to show the optical structure of an image pickup optical system according to Example 8 when achieving focus on an object point at infinity.

Figure 16:
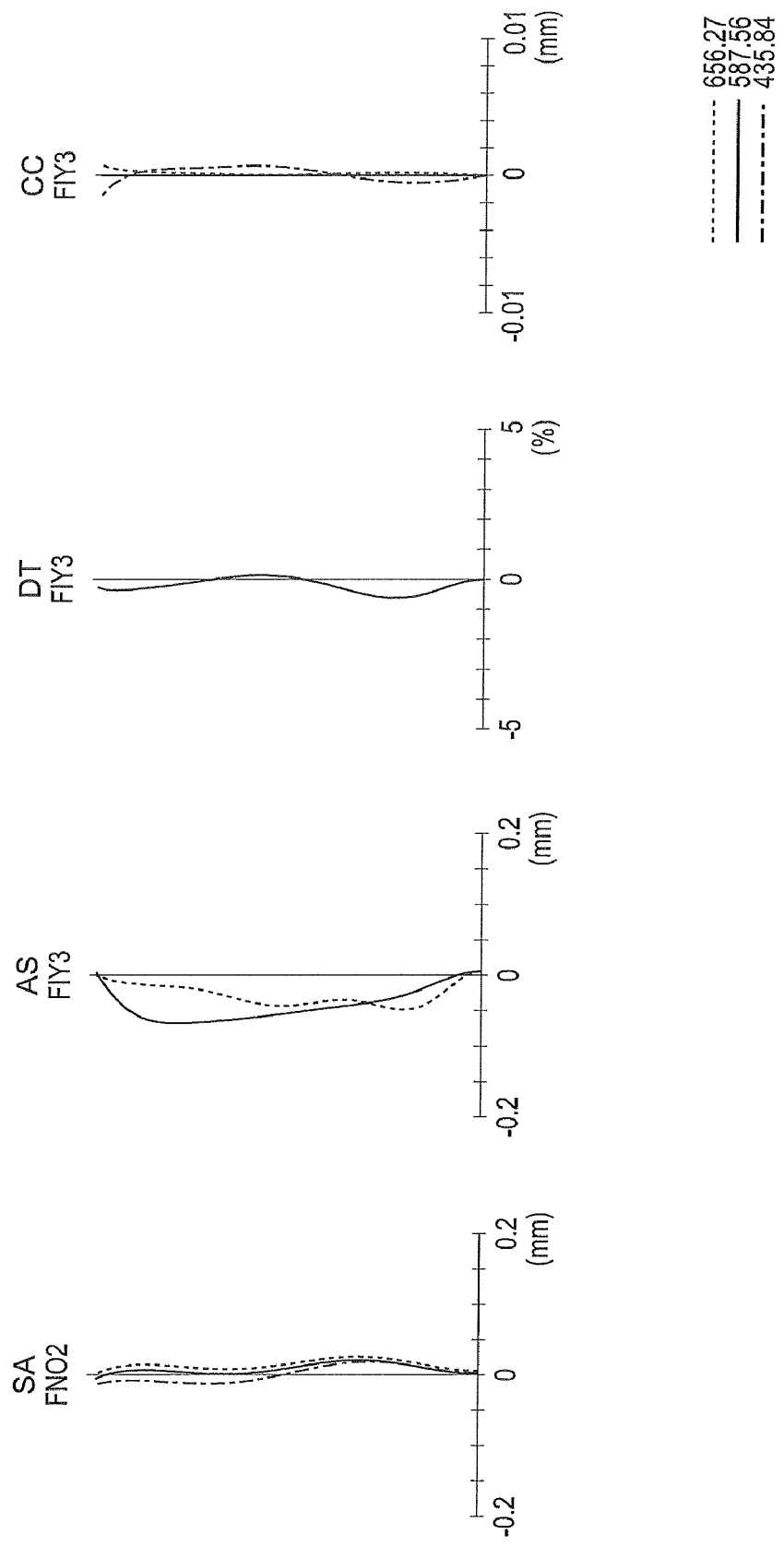
FIG. 16 is a diagram showing spherical aberration (SA), astigmatism (AS), distortion (DT), and chromatic aberration of magnification (CC) when the image pickup optical system according to Example 8 focuses on the object point at infinity.

FIG. 16 is a diagram showing spherical aberration (SA), astigmatism (AS), distortion (DT), and chromatic aberration of magnification (CC) when the image pickup optical system according to Example 8 focuses on the object point at infinity.

As shown in FIG. 15, the image pickup optical system of Example 8 includes, in order from the object side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power.

The first lens L1 is a biconvex positive lens. The second lens L2 is a negative meniscus lens facing its convex surface toward the object side. The third lens L3 is a biconvex positive lens. The fourth lens L4 is a positive meniscus lens facing its convex surface toward the image plane side. The fifth lens L5 is a negative meniscus lens facing its convex surface toward the object side.

Aspheric surfaces are provided on both sides of all the lenses from the first lens L1 to the fifth lens L5.

Numerical data of each embodiment described above is shown below. Apart from symbols described above, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. Further, FNO denotes an F number, f denotes a focal length of the entire zoom lens system, * denotes an aspheric data, BF denotes a back focus.

When z is let to be an optical axis with a direction of traveling of light as a positive (direction), and y is let to be in a direction orthogonal to the optical axis, a shape of the aspheric surface is described by the following expression:

$$z=(y^2/r)/[1+\{1-(K+1)(y/r)^2\}^{1/2}]+A_4y^4+A_6y^6A_8y^8+A_{10}y^{10}A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'. Symbols in the numerals data are common in the numeral data of each of examples.

Further "*" means that the surface is an aspheric surface.

Example 1

| Unit mm | | | | |
|---|---|---|---|---|
| Surface data | | | | |
| Surface no. | r | d | nd | vd |
| Object plane | ∞ | ∞ | | |
| 1(Stop) | ∞ | −0.35 | | |
| 2* | 2.440 | 0.77 | 1.53368 | 55.90 |
| 3* | −10.477 | 0.13 | | |
| 4* | 7.505 | 0.32 | 1.61420 | 25.59 |
| 5* | 2.024 | 0.48 | | |
| 6* | 23.914 | 0.83 | 1.53368 | 55.90 |
| 7* | −5.586 | 0.58 | | |
| 8* | −2.723 | 0.64 | 1.53368 | 55.90 |
| 9* | −1.196 | 0.60 | | |
| 10* | −7.646 | 0.44 | 1.53368 | 55.90 |
| 11* | 1.971 | 0.58 | | |

-continued

| | | Unit mm | | |
|---|---|---|---|---|
| 12 | ∞ | 0.30 | 1.51633 | 64.14 |
| 13 | ∞ | 0.61 | | |

Aspherical surface data

2nd surface k = −0.599
A4 = 1.12317e−02, A6 = 3.48314e−03, A8 = 2.02768e−03
3rd surface k = −576.615
A4 = 1.24154e−02, A6 = 1.88361e−02, A8 = −1.31275e−02
4th surface k = −10.712
A4 = −1.53575e−02, A6 = 2.10836e−03, A8 = −7.90012e−03,
A10 = −4.54582e−03
5th surface k = 0.131
A4 = −7.54593e−02, A6 = 4.52138e−02, A8 = −2.84244e−02,
A10 = 5.59790e−03
6th surface k = 0.000
A4 = −2.24096e−02, A6 = −5.07084e−03, A8 = 6.52322e−03,
A10 = −1.63989e−03
7th surface k = 0.000
A4 = −3.24487e−02, A6 = 1.44236e−02, A8 = −1.10883e−02,
A10 = 1.77374e−03
8th surface k = 0.919
A4 = −3.67292e−02, A6 = 4.38769e−02, A8 = −1.35498e−02,
A10 = 1.92171e−03, A12 = 2.23362e−05
9th surface k = −1.230
A4 = 3.10799e−02, A6 = −1.28481e−02, A8 = 5.50506e−03,
A10 = −1.42205e−04, A12 = −7.64155e−05
10th surface k = 7.565
A4 = 6.14383e−03, A6 = −9.94886e−03, A8 = 1.37642e−03,
A10 = 1.88012e−05, A12 = −5.36749e−06
11th surface k = −8.218
A4 = −2.32099e−02, A6 = 2.66597e−03, A8 = −5.67330e−04,
A10 = 6.24114e−05, A12 = −2.69932e−06

| BF (in air) | 1.39 |
|---|---|
| Lens total length (in air) | 6.18 |
| Total system focal length | 4.83 |

Example 2

| | | Unit mm | | |
|---|---|---|---|---|

Surface data

| Surface no. | r | d | nd | vd |
|---|---|---|---|---|
| Object plane | ∞ | ∞ | | |
| 1(Stop) | ∞ | −0.31 | | |
| 2* | 2.641 | 0.77 | 1.53368 | 55.90 |
| 3* | −6.951 | 0.17 | | |
| 4* | 11.891 | 0.32 | 1.61420 | 25.59 |
| 5* | 2.044 | 0.41 | | |
| 6* | 6.552 | 0.77 | 1.53368 | 55.90 |
| 7* | −9.219 | 0.52 | | |
| 8* | −2.586 | 0.75 | 1.53368 | 55.90 |
| 9* | −1.178 | 0.57 | | |
| 10* | −6.217 | 0.56 | 1.53368 | 55.90 |
| 11* | 2.099 | 0.58 | | |
| 12 | ∞ | 0.30 | 1.51633 | 64.14 |
| 13 | ∞ | 0.61 | | |

Aspherical surface data

2nd surface k = −0.897
A4 = 9.37088e−03, A6 = −1.00458e−03, A8 = 2.75896e−03
3rd surface k = −160.384
A4 = 1.74714e−02, A6 = −3.14751e−03, A8 = 3.62813e−03
4th surface k = 34.466
A4 = −1.09321e−02, A6 = 4.45947e−03, A8 = −4.64501e−03,
A10 = 6.44346e−04
5th surface k = 0.088
A4 = −8.74463e−02, A6 = 5.09310e−02, A8 = −2.36496e−02,
A10 = 3.95168e−03
6th surface k = 0.000
A4 = −3.03462e−02, A6 = −3.32371e−03, A8 = 4.95235e−03,
A10 = −2.82618e−04
7th surface k = 0.000
A4 = −3.00710e−02, A6 = 1.58202e−02, A8 = −1.11251e−02,
A10 = 2.58020e−03
8th surface k = 0.770
A4 = −3.12677e−02, A6 = 4.48383e−02, A8 = −1.24677e−02,
A10 = 2.40034e−03, A12 = −1.87309e−04
9th surface k = −1.402
A4 = 2.39508e−02, A6 = −1.37276e−02, A8 = 6.80327e−03,
A10 = −1.59985e−04, A12 = −1.35344e−04
10th surface k = 5.099
A4 = 1.71397e−02, A6 = −1.05561e−02, A8 = 1.20948e−03,
A10 = 2.58810e−05, A12 = −2.93530e−06
11th surface k = −9.742
A4 = −1.94080e−02, A6 = 2.38798e−03, A8 = −6.01021e−04,
A10 = 7.14531e−05, A12 = −3.32052e−06

| BF (in air) | 1.39 |
|---|---|
| Lens total length (in air) | 6.22 |
| Total system focal length | 4.83 |

Example 3

| | Unit mm | | | |
|---|---|---|---|---|
| | Surface data | | | |
| Surface no. | r | d | nd | vd |
| Object plane | ∞ | ∞ | | |
| 1(Stop) | ∞ | −0.34 | | |
| 2* | 2.468 | 0.78 | 1.53368 | 55.90 |
| 3* | −8.207 | 0.16 | | |
| 4* | 14.479 | 0.32 | 1.61420 | 25.59 |
| 5* | 2.049 | 0.43 | | |
| 6* | 5.723 | 0.78 | 1.53368 | 55.90 |
| 7* | −10.799 | 0.44 | | |
| 8* | −2.625 | 0.83 | 1.53368 | 55.90 |
| 9* | −1.206 | 0.68 | | |
| 10* | −6.231 | 0.43 | 1.53368 | 55.90 |
| 11* | 2.110 | 0.58 | | |
| 12 | ∞ | 0.30 | 1.51633 | 64.14 |
| 13 | ∞ | 0.58 | | |

Aspherical surface data

2nd surface $k = -0.606$
$A4 = 1.16998e-02, A6 = -1.46368e-03, A8 = 3.86120e-03$
3rd surface $k = -277.062$
$A4 = 2.12171e-02, A6 = -4.10754e-03, A8 = 4.17051e-03$
4th surface $k = 25.139$
$A4 = -9.38778e-03, A6 = -2.43793e-04, A8 = -1.04062e-03,$
$A10 = -1.11891e-03$
5th surface $k = 0.292$
$A4 = -9.01873e-02, A6 = 5.45676e-02, A8 = -2.55743e-02,$
$A10 = 3.97760e-03$
6th surface $k = 0.000$
$A4 = -3.37340e-02, A6 = -2.73158e-03, A8 = 5.25322e-03,$
$A10 = -5.22112e-04$
7th surface $k = 0.000$
$A4 = -3.29523e-02, A6 = 1.57911e-02, A8 = -1.04174e-02,$
$A10 = 2.33750e-03$
8th surface $k = 0.792$
$A4 = -3.07059e-02, A6 = 4.56142e-02, A8 = -1.24436e-02,$
$A10 = 2.25572e-03, A12 = -1.58094e-04$
9th surface $k = -1.324$
$A4 = 2.65702e-02, A6 = -1.34232e-02, A8 = 6.59309e-03,$
$A10 = -1.38976e-04, A12 = -1.37537e-04$
10th surface $k = 4.805$
$A4 = 1.17470e-02, A6 = -9.96360e-03, A8 = 1.36952e-03,$
$A10 = 6.54083e-05, A12 = -1.29532e-05$
11th surface $k = -8.831$
$A4 = -2.31969e-02, A6 = 2.64634e-03, A8 = -5.61449e-04,$
$A10 = 7.28908e-05, A12 = -3.62569e-06$

| | | |
|---|---|---|
| BF (in air) | | 1.36 |
| Lens total length (in air) | | 6.21 |
| Total system focal length | | 4.84 |

Example 4

| | Unit mm | | | |
|---|---|---|---|---|
| | Surface data | | | |
| Surface no. | r | d | nd | vd |
| Object plane | ∞ | ∞ | | |
| 1(Stop) | ∞ | −0.36 | | |
| 2* | 1.838 | 0.74 | 1.53368 | 55.90 |
| 3* | −5.678 | 0.05 | | |
| 4* | 12.000 | 0.34 | 1.61420 | 25.59 |
| 5* | 1.663 | 0.38 | | |
| 6* | 6.878 | 0.50 | 1.53368 | 55.90 |
| 7* | −46.847 | 0.46 | | |
| 8* | −2.348 | 0.57 | 1.53368 | 55.90 |
| 9* | −1.027 | 0.48 | | |
| 10* | −5.836 | 0.35 | 1.53368 | 55.90 |
| 11* | 1.964 | 0.46 | | |
| 12 | ∞ | 0.30 | 1.51633 | 64.14 |
| 13 | ∞ | 0.56 | | |

Aspherical surface data

2nd surface $k = -0.500$
$A4 = 2.21594e-02, A6 = -1.13509e-02, A8 = 1.48134e-02$
3rd surface $k = -150.399$
$A4 = 4.20523e-03, A6 = 5.46571e-02, A8 = -2.96955e-02$
4th surface $k = -396.790$
$A4 = -3.21244e-02, A6 = 9.03092e-02, A8 = -5.34768e-02,$
$A10 = -7.91713e-03$
5th surface $k = 0.792$
$A4 = -1.88389e-01, A6 = 1.68140e-01, A8 = -9.11864e-02,$
$A10 = 3.25383e-03$
6th surface $k = -92.351$
$A4 = -3.86816e-02, A6 = -3.58225e-02, A8 = 2.47229e-02,$
$A10 = 7.34111e-03$
7th surface $k = -428.024$
$A4 = -5.04841e-02, A6 = 3.44267e-02, A8 = -6.34054e-02,$
$A10 = 2.75610e-02$
8th surface $k = 1.650$
$A4 = -3.50311e-02, A6 = 1.31496e-01, A8 = -7.22487e-02,$
$A10 = 1.72453e-02, A12 = 3.93877e-04$
9th surface $k = -1.130$
$A4 = 7.91528e-02, A6 = -2.63691e-02, A8 = 2.30917e-02,$
$A10 = -2.36473e-03, A12 = -1.02213e-03$
10th surface $k = 0.435$
$A4 = 2.45806e-02, A6 = -2.52262e-02, A8 = 4.79920e-03,$
$A10 = 1.59110e-04, A12 = -7.18346e-05$
11th surface $k = -11.491$
$A4 = -3.64367e-02, A6 = 4.92305e-03, A8 = -1.90292e-03,$
$A10 = 3.02521e-04, A12 = -1.90752e-05$

| | | |
|---|---|---|
| BF (in air) | | 1.22 |
| Lens total length (in air) | | 5.10 |
| Total system focal length | | 4.28 |

Example 5

| | Unit mm | | | |
|---|---|---|---|---|
| | Surface data | | | |
| Surface no. | r | d | nd | vd |
| Object plane | ∞ | ∞ | | |
| 1(Stop) | ∞ | −0.36 | | |
| 2* | 1.814 | 0.69 | 1.53368 | 55.90 |
| 3* | −9.246 | 0.05 | | |
| 4* | 6.139 | 0.34 | 1.61420 | 25.59 |
| 5* | 1.643 | 0.45 | | |
| 6* | 14.601 | 0.52 | 1.53368 | 55.90 |
| 7* | −4.505 | 0.26 | | |
| 8* | −1.498 | 0.61 | 1.53368 | 55.90 |
| 9* | −1.027 | 0.42 | | |
| 10* | 12.180 | 0.45 | 1.53368 | 55.90 |
| 11* | 1.488 | 0.46 | | |
| 12 | ∞ | 0.30 | 1.51633 | 64.14 |
| 13 | ∞ | 0.69 | | |

Aspherical surface data

2nd surface $k = -0.603$
$A4 = 1.92984e-02, A6 = -2.20073e-03, A8 = 8.57450e-03$ 3rd surface $k = -507.451$
$A4 = -9.62241e-03, A6 = 5.38840e-02, A8 = -2.94817e-02$ 4th surface $k = -51.117$
$A4 = -4.13389e-02, A6 = 7.14397e-02, A8 = -4.29244e-02,$
$A10 = -3.84809e-03$ 5th surface $k = -0.346$
$A4 = -1.19863e-01, A6 = 1.38921e-01, A8 = -8.27229e-02,$
$A10 = 2.36909e-02$ 6th surface $k = -535.957$
$A4 = -2.51071e-02, A6 = -2.95193e-02, A8 = 1.21599e-02,$
$A10 = 8.81144e-03$ 7th surface $k = -14.791$
$A4 = -6.30609e-02, A6 = 5.70980e-02, A8 = -4.46778e-02,$
$A10 = 1.64181e-02$ 8th surface $k = -0.207$
$A4 = 1.87684e-02, A6 = 1.11253e-01, A8 = -4.98797e-02,$
$A10 = 1.23310e-02, A12 = -1.16581e-03$ 9th surface $k = -1.825$
$A4 = 9.02884e-03, A6 = -1.05024e-02, A8 = 1.85446e-02,$
$A10 = -3.78854e-03, A12 = -9.42612e-05$ 10th surface $k = -949.972$
$A4 = -5.43092e-02, A6 = 1.16749e-03, A8 = 8.41177e-04,$
$A10 = 2.60846e-04, A12 = -4.79714e-05$ 11th surface $k = -8.476$
$A4 = -5.61138e-02, A6 = 1.25647e-02, A8 = -3.12325e-03,$
$A10 = 4.29571e-04, A12 = -2.63925e-05$

| | |
|---|---|
| BF (in air) | 1.35 |
| Lens total length (in air) | 5.12 |
| Total system focal length | 4.24 |

Example 6

| | Unit mm | | | |
|---|---|---|---|---|
| | Surface data | | | |
| Surface no. | r | d | nd | vd |
| Object plane | ∞ | ∞ | | |
| 1(Stop) | ∞ | −0.43 | | |
| 2* | 2.459 | 0.84 | 1.53368 | 55.90 |
| 3* | 4712.133 | 0.10 | | |
| 4* | 5.241 | 0.35 | 1.61420 | 25.59 |
| 5* | 2.189 | 0.44 | | |
| 6* | 11.914 | 0.76 | 1.53368 | 55.90 |
| 7* | −7.676 | 0.41 | | |
| 8* | −2.964 | 0.90 | 1.53368 | 55.90 |
| 9* | −1.394 | 0.79 | | |
| 10* | −10.576 | 0.48 | 1.53368 | 55.90 |
| 11* | 2.263 | 0.63 | | |
| 12 | ∞ | 0.30 | 1.51633 | 64.14 |
| 13 | ∞ | 0.44 | | |

Aspherical surface data

2nd surface $k = 0.128$
$A4 = 8.70732e-03, A6 = -2.89988e-03, A8 = 1.39157e-03$

3rd surface $k = -57993359.910$
$A4 = 1.13786e-02, A6 = -8.20423e-04, A8 = -4.10777e-03$ 4th surface $k = -31.654$
$A4 = -2.05727e-02, A6 = 5.21056e-03, A8 = -7.92488e-03,$
$A10 = -3.84174e-04$ 5th surface $k = 0.406$
$A4 = -5.28881e-02, A6 = 1.30847e-02, A8 = -3.56975e-03,$
$A10 = 1.99139e-05$ 6th surface $k = 0.000$
$A4 = -1.41153e-02, A6 = -1.95999e-03, A8 = 2.72113e-03,$
$A10 = -1.15667e-04$ 7th surface $k = -9.887$
$A4 = -1.49605e-02, A6 = 5.17680e-03, A8 = -5.42208e-03,$
$A10 = 1.15567e-03$ 8th surface $k = 1.465$
$A4 = -6.20596e-03, A6 = 2.29361e-02, A8 = -6.34203e-03,$
$A10 = 7.23840e-04, A12 = 2.78089e-05$ 9th surface $k = -1.484$
$A4 = 1.80961e-02, A6 = -7.68615e-03, A8 = 2.67933e-03,$
$A10 = -9.23774e-05, A12 = -4.41666e-05$ 10th surface $k = 8.171$
$A4 = 6.89743e-03, A6 = -5.88765e-03, A8 = 4.91031e-04,$
$A10 = 2.30872e-05, A12 = -2.58392e-06$ 11th surface $k = -7.117$
$A4 = -1.39411e-02, A6 = 1.99700e-03, A8 = -3.92145e-04,$
$A10 = 2.86020e-05, A12 = -6.82907e-07$

| | |
|---|---|
| BF (in air) | 1.27 |
| Lens total length (in air) | 6.34 |
| Total system focal length | 4.84 |

Example 7

| Unit mm | | | | |
|---|---|---|---|---|
| Surface data | | | | |
| Surface no. | r | d | nd | vd |
| Object plane | ∞ | ∞ | | |
| 1(Stop) | ∞ | −0.36 | | |
| 2* | 2.386 | 0.70 | 1.53463 | 56.22 |
| 3* | −571.375 | 0.22 | | |
| 4* | 10.074 | 0.33 | 1.61417 | 25.64 |
| 5* | 2.336 | 0.34 | | |
| 6* | 6.064 | 0.93 | 1.53463 | 56.22 |
| 7* | −23.008 | 0.64 | | |
| 8* | −10.077 | 0.88 | 1.53463 | 56.22 |
| 9* | −1.086 | 0.30 | | |
| 10* | −2.785 | 0.60 | 1.53463 | 56.22 |
| 11* | 1.678 | 0.64 | | |
| 12 | ∞ | 0.31 | 1.51633 | 64.14 |
| 13 | ∞ | 0.55 | | |
| Image plane (Light receiving surface) | ∞ | | | |

Aspherical surface data

2nd surface $K = -0.249$
$A4 = 1.10160e-02, A6 = 8.20823e-04, A8 = 5.50513e-03,$
$A10 = -1.85121e-03$ 3rd surface $K = -26514025.924$
$A4 = 2.12839e-02, A6 = -5.23285e-03, A8 = 8.55987e-03,$
$A10 = -8.70789e-03$ 4th surface $K = -164.761$
$A4 = -1.94228e-02, A6 = 6.68562e-03, A8 = -1.18031e-02,$
$A10 = -5.29881e-03$ 5th surface $K = -0.208$
$A4 = -5.66900e-02, A6 = 4.75946e-02, A8 = -3.27933e-02,$
$A10 = 7.52633e-03$ 6th surface $K = -56.276$
$A4 = 6.94093e-03, A6 = -8.36869e-03, A8 = 6.12755e-03,$
$A10 = -1.68376e-03$ 7th surface $K = -25.303$
$A4 = -1.93660e-02, A6 = -5.68041e-04, A8 = -3.64395e-03,$
$A10 = 6.97591e-04$ 8th surface $K = -2.998$
$A4 = -3.76355e-02, A6 = 2.25529e-02, A8 = -6.08409e-03,$
$A10 = 4.60417e-04, A12 = -2.80926e-06$ 9th surface $K = -2.886$
$A4 = -1.71570e-02, A6 = -2.18361e-03, A8 = 7.36680e-03,$
$A10 = -1.68801e-03, A12 = 1.07135e-04$ 10th surface $K = -18.428$
$A4 = -9.35235e-03, A6 = -1.21051e-03, A8 = 4.45736e-04,$
$A10 = 2.08995e-06, A12 = -2.43601e-06, A14 = -1.25165e-07$ 11th surface $K = -8.658$
$A4 = -1.81209e-02, A6 = 2.40699e-03, A8 = -2.77762e-04,$
$A10 = 1.50833e-05, A12 = -6.96316e-07, A14 = 3.06251e-08$ -continued

| Unit mm | |
|---|---|
| Total system focal length | 4.83 |
| BF (in air) | 1.40 |
| Lens total length (in air) | 6.33 |

Example 8

| Unit mm | | | | |
|---|---|---|---|---|
| Surface data | | | | |
| Surface no. | r | d | nd | vd |
| Object plane | ∞ | ∞ | | |
| 1(Stop) | ∞ | −0.37 | | |
| 2* | 1.852 | 0.72 | 1.53463 | 56.22 |
| 3* | −6.069 | 0.05 | | |
| 4* | 5.442 | 0.33 | 1.61417 | 25.64 |
| 5* | 1.496 | 0.56 | | |
| 6* | 9.70 | 0.49 | 1.53463 | 56.22 |
| 7* | −6.901 | 0.24 | | |
| 8* | −1.544 | 0.56 | 1.53463 | 56.22 |
| 9* | −0.910 | 0.19 | | |
| 10* | 10.666 | 0.44 | 1.53463 | 56.22 |
| 11* | 1.253 | 0.50 | | |
| 12 | ∞ | 0.65 | 1.51633 | 64.14 |
| 13 | ∞ | 0.62 | | |
| Image plane (Light receiving surface) | ∞ | | | |

Aspherical surface data

2nd surface $K = -0.676$
$A4 = 1.61049e-02, A6 = 2.26171e-03, A8 = 5.41444e-03$

3rd surface $K = -185.530$
$A4 = 1.15829e-02, A6 = 3.11626e-02, A8 = -2.18882e-02$ 4th surface $K = -31.283$
$A4 = -3.28836e-02, A6 = 7.18491e-02, A8 = -5.98942e-02,$
$A10 = 5.19789e-03$ 5th surface $K = -0.716$
$A4 = -1.41727e-01, A6 = 1.76225e-01, A8 = -1.18361e-01,$
$A10 = 3.12245e-02$ 6th surface $K = -88.287$
$A4 = -4.64226e-02, A6 = -2.55239e-02, A8 = 1.32528e-02,$
$A10 = 2.60246e-03$ 7th surface $K = -0.369$
$A4 = -9.20295e-02, A6 = 5.56217e-02, A8 = -4.51346e-02,$
$A10 = 1.82754e-02$ 8th surface $K = -0.092$
$A4 = 1.22811e-02, A6 = 1.08701e-01, A8 = -4.29172e-02,$
$A10 = 1.36030e-02, A12 = -1.99685e-03$ 9th surface $K = -2.616$
$A4 = -2.02901e-02, A6 = -3.83308e-03, A8 = 2.42000e-02,$
$A10 = -4.01659e-03, A12 = -5.34410e-04$ -continued Unit mm 10th surface K = 0.000
A4 = −8.54285e−02, A6 = −7.10526e−03, A8 = 3.52045e−03,
A10 = 1.31509e−03, A12 = −2.84334e−04

11th surface

K = −8.928
A4 = −7.72434e−02, A6 = 1.61168e−02, A8 = −3.79642e−03,
A10 = 6.16874e−04, A12 = −5.37424e−05

| | |
|---|---|
| Total system focal length | 4.35 |
| BF (in air) | 1.55 |
| Lens total length (in air) | 5.13 |

Further, values of the conditional expressions are shown below:

| | Example 1 | Example 2 | Example 3 |
|---|---|---|---|
| Conditional expression (1) | 0.62 | −0.17 | −0.31 |
| Conditional expression (2) | 0.44 | 0.51 | 0.51 |
| Conditional expression (3) | −1.99 | −2.06 | −1.77 |
| Conditional expression (4) | 0.78 | 0.76 | 0.75 |
| Conditional expression (5) | 3.39 | 3.38 | 3.38 |
| Conditional expression (6) | 2.47 | 2.47 | 2.46 |

| | Example 4 | Example 5 | Example 6 |
|---|---|---|---|
| Conditional expression (1) | −0.74 | 0.53 | 0.22 |
| Conditional expression (2) | 0.24 | 0.45 | 0.52 |
| Conditional expression (3) | −2.13 | −2.43 | −1.76 |
| Conditional expression (4) | 0.63 | 0.69 | 0.95 |
| Conditional expression (5) | 3.27 | 3.27 | 3.15 |
| Conditional expression (6) | 2.24 | 2.24 | 2.33 |

| | Example 7 | Example 8 |
|---|---|---|
| Conditional expression (1) | −0.58 | 0.17 |
| Conditional expression (2) | 0.49 | 0.36 |
| Conditional expression (3) | −3.62 | −4.69 |
| Conditional expression (4) | 0.92 | 0.63 |
| Conditional expression (5) | 3.68 | 3.02 |
| Conditional expression (6) | 2.77 | 2.01 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 17:
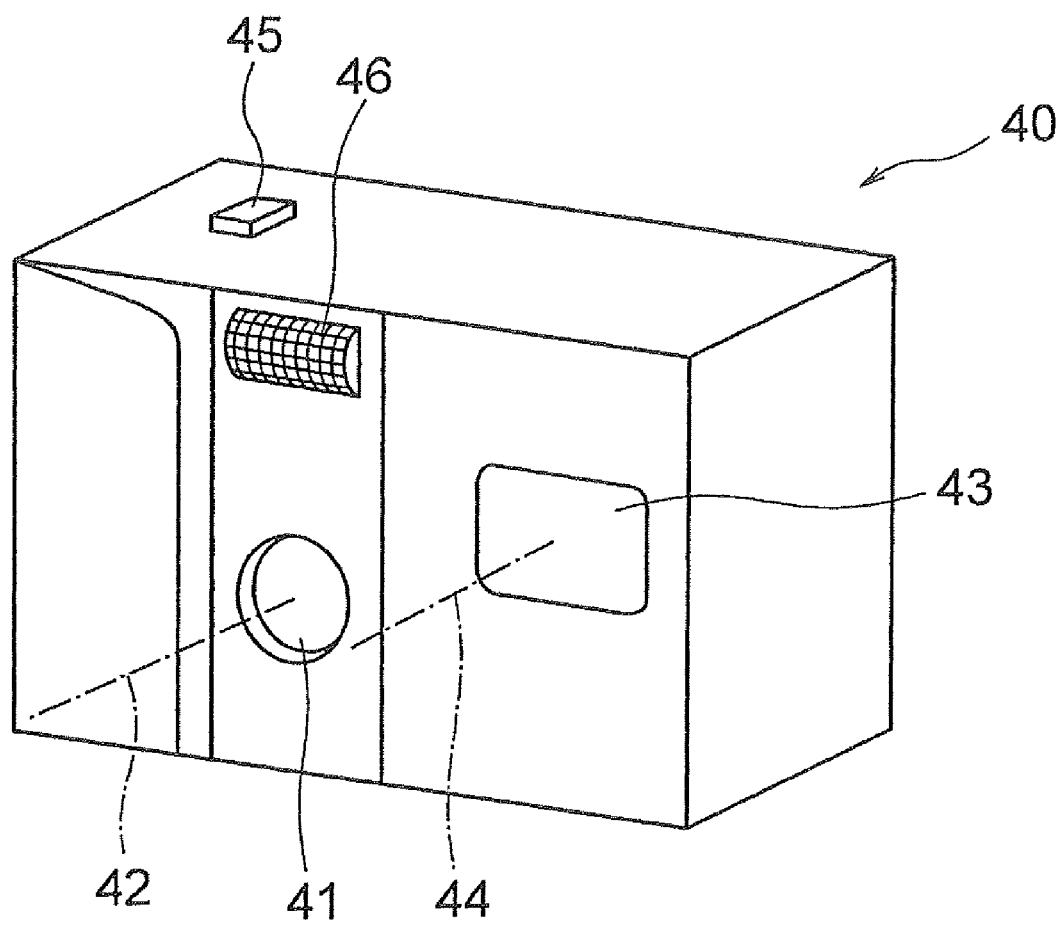
FIG. 17 is a front perspective view showing the appearance of a digital camera 40 in which a zoom optical system according to the present invention is incorporated.
Figure 18:
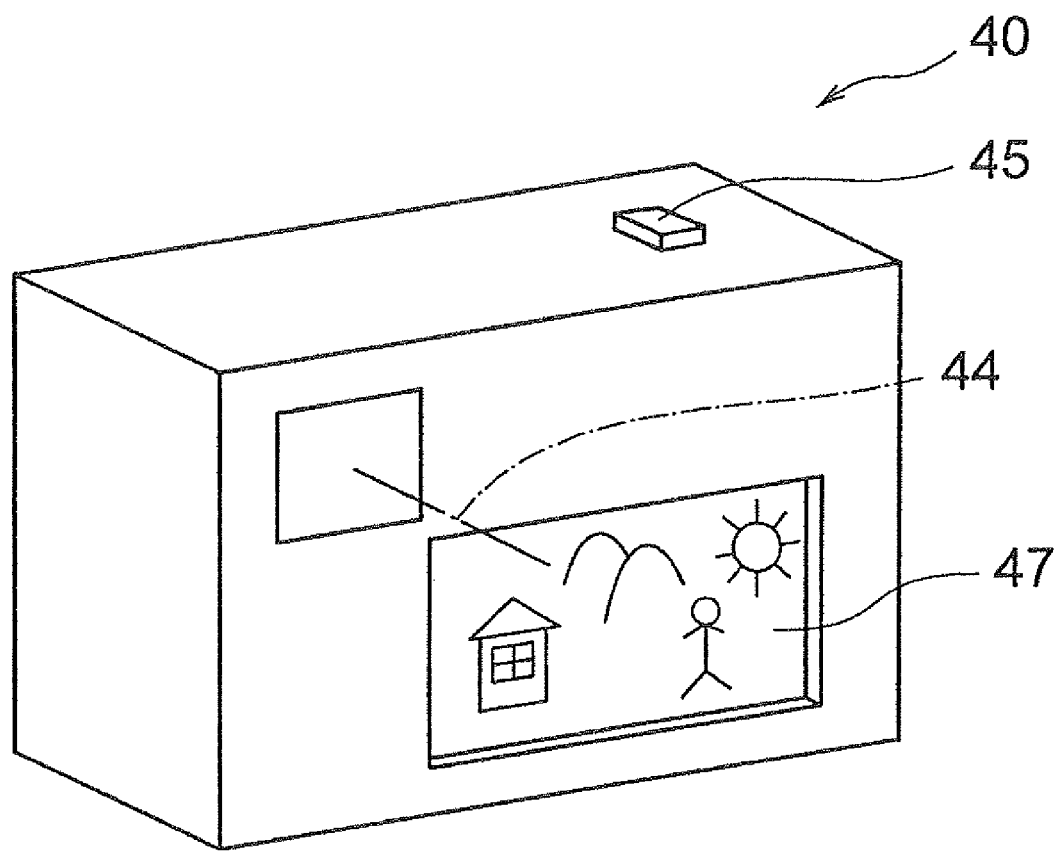
FIG. 18 is a rear perspective view of the digital camera 40.
Figure 19:
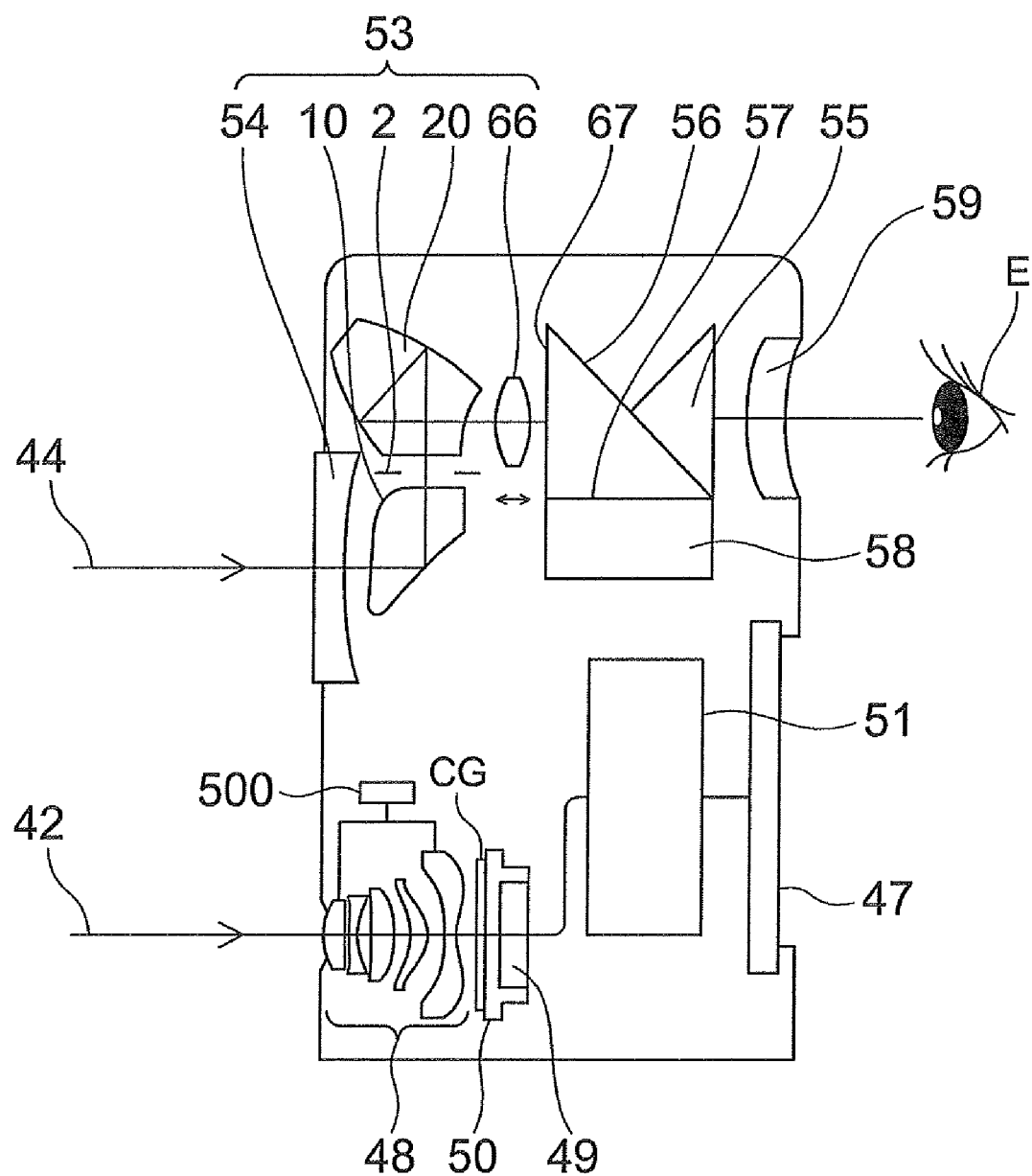
FIG. 19 is a sectional view showing the optical structure of the digital camera 40.

FIG. 17 to FIG. 19 show conceptual diagrams of structures in which the image forming optical system according to the present invention is incorporated in a photographic optical system 41 of a digital camera. FIG. 17 is a frontward perspective view showing an appearance of a digital camera 40, FIG. 18 is a rearward perspective view of the same, and FIG. 19 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced. Further, the present invention could be applied to the above-mentioned collapsible type digital camera as well as a bending type (an optical path reflecting type) digital camera having a bending optical system (optical path reflecting lens).

Further, the digital camera comprises an autofocus mechanism 500 integrated into the image pickup optical system. If the autofocus mechanism is incorporated, focus can be achieved at all subject object distances.

Further, the objective optical system 100 (the image pickup optical system) and the electronic image pickup chip 162 (the electronic image pickup device) are integrated as a unit.

If the electronic image pickup device is integrated as a unit, an optical image produced by the image pickup optical system can be converted to an electric signal. Further, an electronic image pickup device capable of reducing the variations of the image brightness between the center part and the peripheral part of the image can be selected to provide a compact, high-performance image pickup apparatus.

Figure 20:
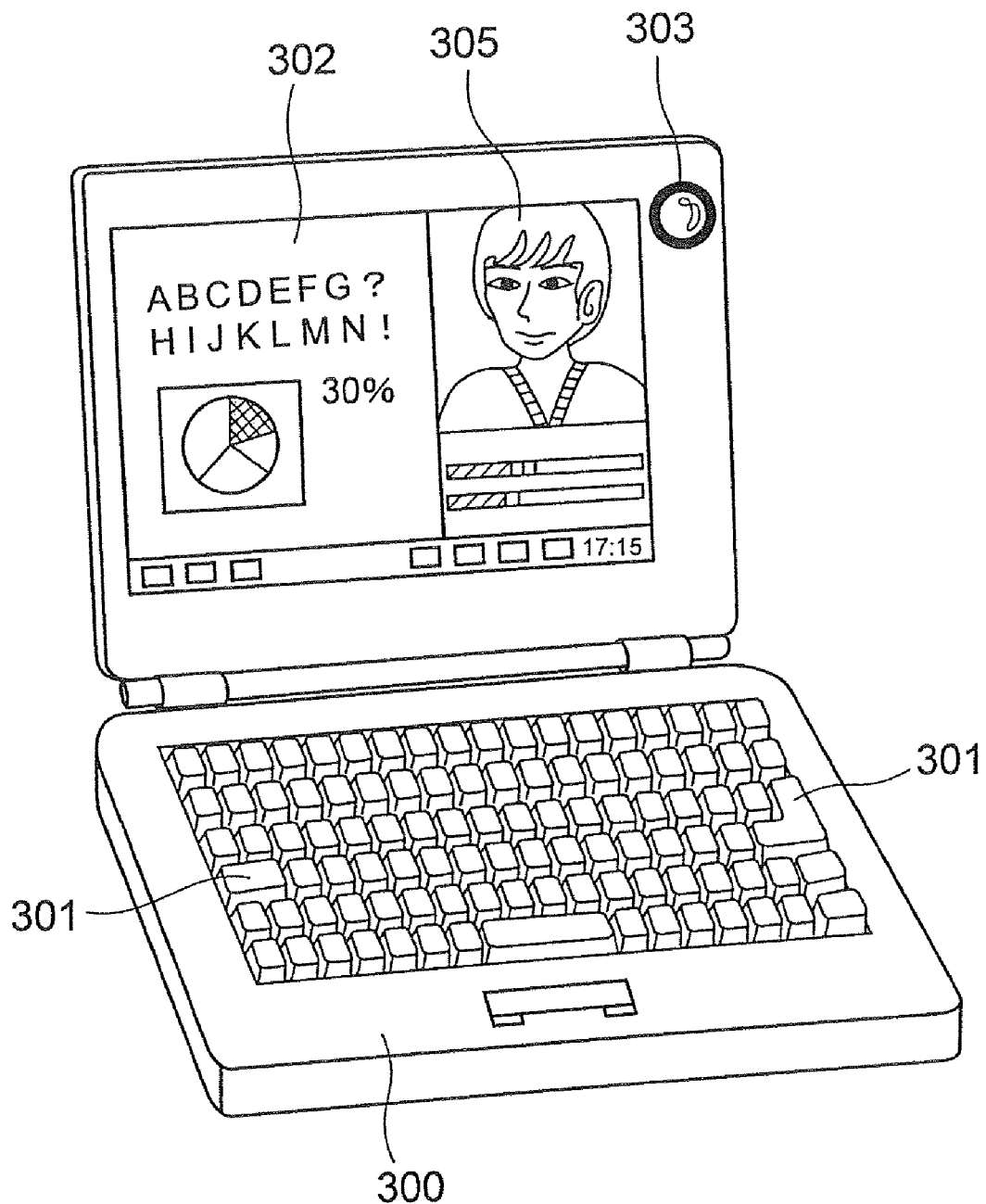
FIG. 20 is a front perspective view of a personal computer 300 with its cover open as an example of an information processing apparatus in which the image pickup optical system of the present invention is incorporated as an objective optical system.
Figure 21:
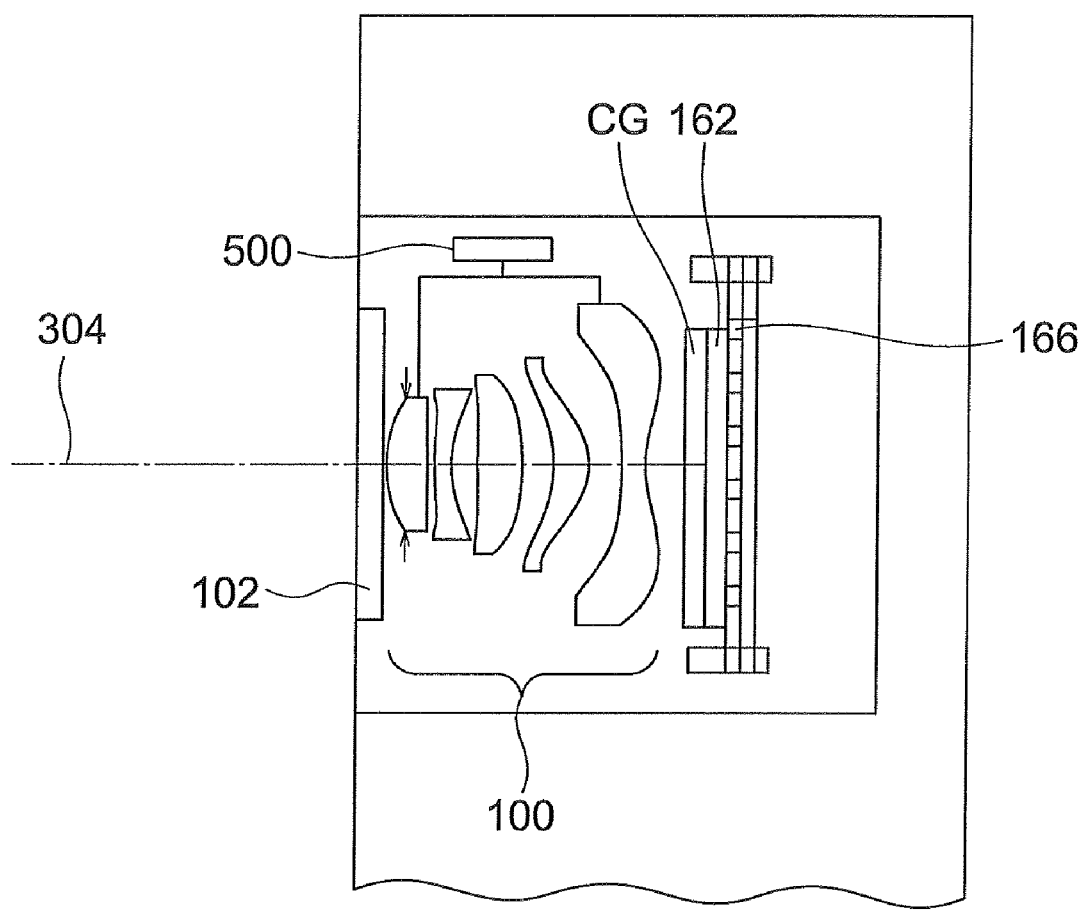
FIG. 21 is a sectional view of a photographing optical system 303 of the personal computer 300.
Figure 22:
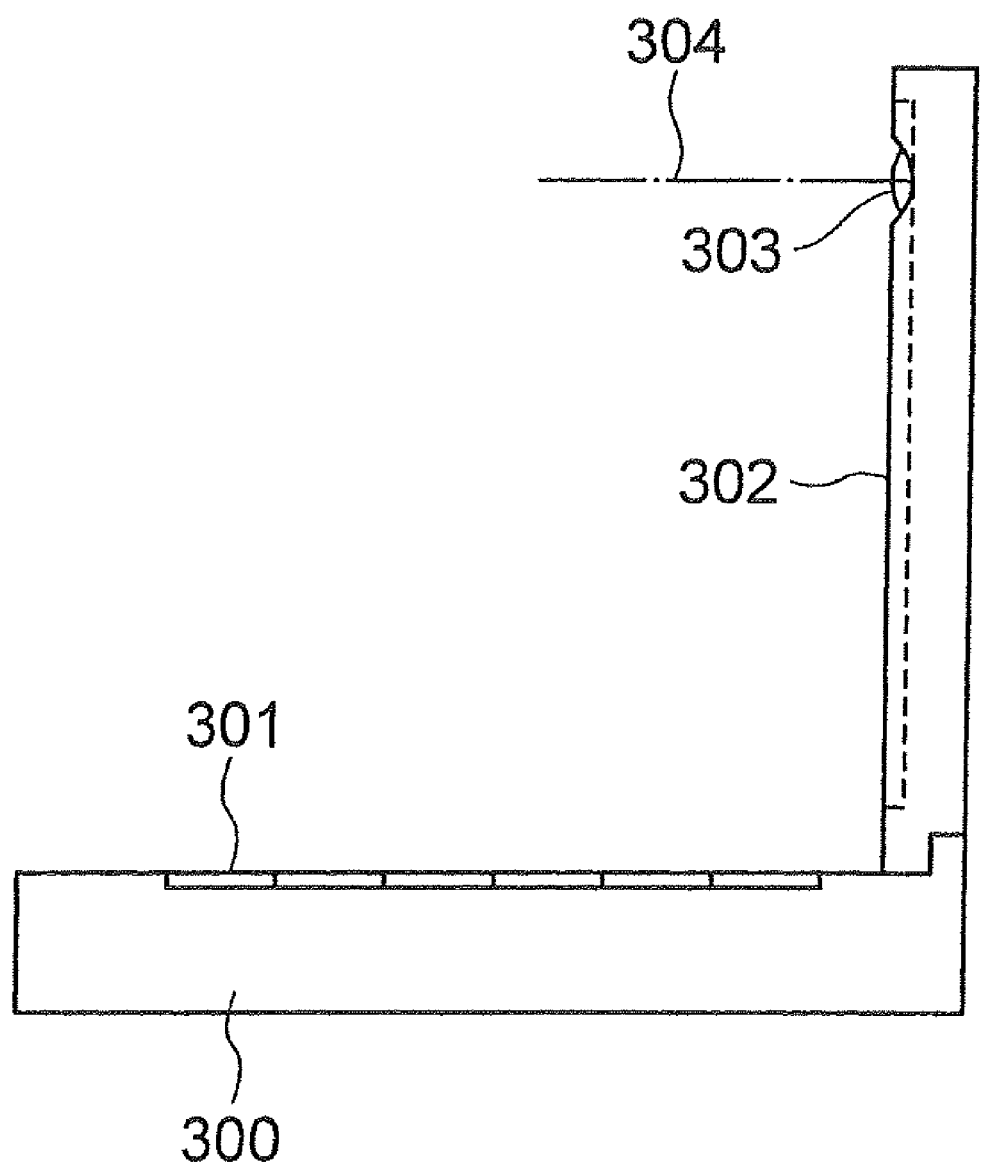
FIG. 22 is a side view of the personal computer 300.

Next, a personal computer which is an example of an information processing apparatus with a built-in image forming system as an objective optical system is shown in FIG. 20 to FIG. 22. FIG. 20 is a frontward perspective view of a personal computer 300 with its cover opened, FIG. 21 is a cross-sectional view of a photographic optical system 303 of the personal computer 300, and FIG. 22 is a side view of FIG. 14. As it is shown in FIG. 14 to FIG. 16, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 20, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Further, the personal computer comprise an autofocus mechanism 500 integrated into the image pickup optical system. If the autofocus mechanism 500 is incorporated, focus can be achieved at all subject object distances.

Further, the objective optical system 100 (the image pickup optical system) and the electronic image pickup chip 162 (the electronic image pickup device) are integrated as a unit.

If the electronic image pickup device is integrated as a unit, an optical image produced by the image pickup optical system can be converted to an electric signal. Further, a personal computer (an electronic image pickup device) capable of reducing the variations of the image brightness between the center part and the peripheral part of the image can be selected to provide a compact, high-performance image pickup apparatus.

Figure 23A:
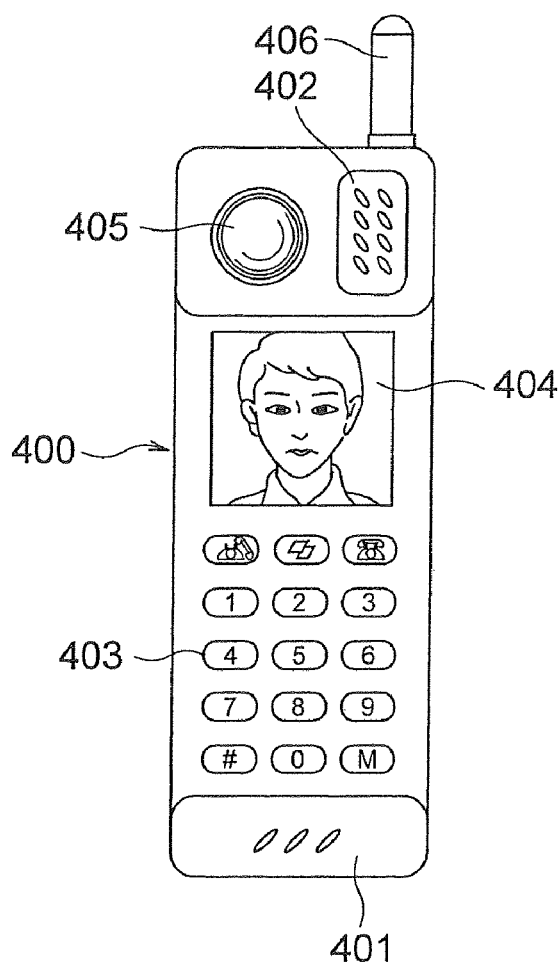
FIGS. 23A, 23B, and 23C are views showing a cellular phone as an example of an information processing apparatus in which the image pickup optical system of the present invention is incorporated as a photographing optical system, where 23A is a front view of a cellular phone 400, 23B is a side view, and 23C is a sectional view of a photographing optical system 405.
Figure 23B:
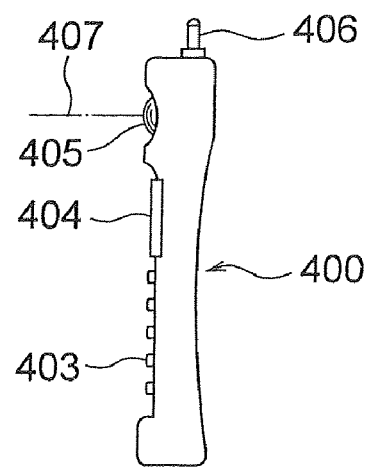
Figure 23C:
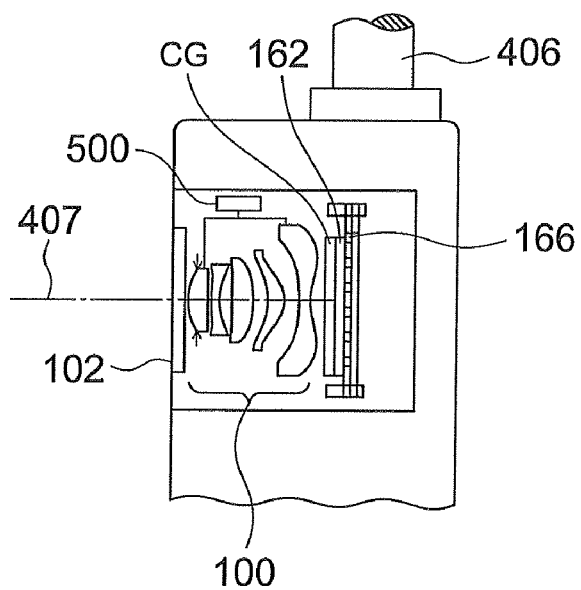

Next, a telephone which is an example of an information processing apparatus in which the image forming optical system of the present invention is built-in as a photographic optical system, particularly a portable telephone which is easy to carry is shown in FIG. 23A, FIG. 23B, and FIG. 23C. FIG. 23A is a front view of a portable telephone 400, FIG. 23B is a side view of the portable telephone 400, and FIG. 23C is a cross-sectional view of a photographic optical system 405. As shown in FIG. 23A to FIG. 23C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Further, the portable telephone comprises an autofocus mechanism 500 integrated into the image pickup optical system. If the autofocus mechanism 500 is incorporated, focus can be achieved at all subject object distances.

Further, the objective optical system 100 (the image pickup optical system) and the electronic image pickup chip 162 (the electronic image pickup device) are integrated as a unit.

If the electronic image pickup device is integrated as a unit, an optical image produced by the image pickup optical system can be converted to an electric signal. Further, a portable telephone (an electronic image pickup device) capable of reducing the variations of the image brightness between the center part and the peripheral part of the image can be selected to provide a compact, high-performance image pickup apparatus.

Various modifications can be made to the present invention without departing from its essence.

As described above, the present invention is useful for a sophisticated image pickup optical system, which is relatively small but of large diameter, for example, with an F-number of 2.0 or less, and in which spherical aberration, astigmatism, curvature of field, chromatic aberration of magnification, coma, and the like are corrected properly.

According to the present invention, there are advantages of being able to provide a sophisticated image pickup optical system, which is relatively small but of large diameter, and in which spherical aberration, astigmatism, curvature of field, chromatic aberration of magnification, coma, and the like are corrected properly, and to provide an image pickup apparatus having the same.

What is claimed is:

1. An image pickup optical system wherein
an aperture is placed on the most object side,
the image pickup optical system comprises, in order from the object side:
a first lens having a positive refractive power;
a second lens having a negative refractive power;
a third lens having a positive refractive power;
a fourth lens having a positive refractive power; and
a fifth lens having a negative refractive power, and
the following conditional expression is satisfied:

$$-1.49 < (r6+r7)/(r6-r7) < 1.24 \quad (1)$$

where
r6 is a paraxial radius of curvature of an object side surface of the third lens, and
r7 is a paraxial radius of curvature of an image plane side surface of the third lens.

2. The image pickup optical system according to claim 1, wherein the third lens is formed into a biconvex shape.

3. The image pickup optical system according to claim 1, wherein the fourth lens is formed into a meniscus shape facing its concave surface toward the object side.

4. The image pickup optical system according to claim 1, wherein the following conditional expression (2) is satisfied:

$$0.12 < f1/f3 < 1.04 \qquad (2)$$

where
f1 is a focal length of the first lens, and
f3 is a focal length of the third lens.

5. The image pickup optical system according to claim 1, wherein the following conditional expression (3) is satisfied:

$$-9.37 < r9/d9 < -0.88 \qquad (3)$$

where
r9 is a paraxial radius of curvature of an image plane side surface of the fourth lens, and
d9 is air space between the fourth lens and the fifth lens.

6. The image pickup optical system according to claim 1, wherein the following conditional expression (4) is satisfied:

$$0.31 < f1/f < 1.91 \qquad (4)$$

where
f1 is a focal length of the first lens, and
f is a focal length of the entire image pickup optical system.

7. The image pickup optical system according to claim 1, wherein the following conditional expression (5) is satisfied:

$$1.51 < \phi L5\text{max}/\phi st < 7.37 \qquad (5)$$

where
$\phi$L5max is a diameter of the most image side lens, and
$\phi$st is a diameter of the aperture.

8. The image pickup optical system according to claim 1, wherein the following conditional expression (6) is satisfied:

$$1.00 < \phi L5\text{edmax}/\phi st < 5.55 \qquad (6)$$

where
$\phi$L5edmax is an effective aperture on the most image side lens, and
$\phi$st is a diameter of the aperture.

9. The image pickup optical system according to claim 1, wherein an object side surface of the fifth lens is formed into a concave shape.

10. The image pickup optical system according to claim 1, wherein the first lens, the second lens, the third lens, the fourth lens, and the fifth lens are made of resin.

11. An image pickup apparatus comprising:
the image pickup optical system according to claim 1, and
an electronic image pickup device having an image pickup plane.

12. The image pickup apparatus according to claim 11, further comprising: an autofocus mechanism integrated into the image pickup optical system.

13. The image pickup apparatus according to claim 11, wherein the image pickup optical system and the electronic image pickup device are integrated as a unit.

* * * * *